(12) United States Patent
McBurney

(10) Patent No.: US 7,463,188 B1
(45) Date of Patent: Dec. 9, 2008

(54) WIRELESS CPU GPS APPLICATION

(75) Inventor: Paul W. McBurney, San Franciso, CA (US)

(73) Assignee: Eride, Inc., San Francisco, CA (US)

( * ) Notice: Subject to any disclaimer, the term of this patent is extended or adjusted under 35 U.S.C. 154(b) by 0 days.

(21) Appl. No.: 11/732,386

(22) Filed: Apr. 3, 2007

(51) Int. Cl.
*G01S 3/02* (2006.01)

(52) U.S. Cl. ............... 342/357.1; 342/357.09; 342/357.04; 342/357.13

(58) Field of Classification Search ........... 342/357.04, 342/357.09, 357.1, 357.13
See application file for complete search history.

(56) References Cited

U.S. PATENT DOCUMENTS

| | | |
|---|---|---|
| 4,445,118 A | 4/1984 | Taylor et al. |
| 6,208,290 B1 | 3/2001 | Krasner |
| 2006/0271246 A1* | 11/2006 | Bell et al. .............. 701/213 |
| 2007/0130153 A1* | 6/2007 | Nachman et al. .......... 707/10 |

OTHER PUBLICATIONS eRide: New GPS Chip, GPS World, vol. 14(6), p. 114, Jun. 2003.*

* cited by examiner

*Primary Examiner*—Thomas H Tarcza
*Assistant Examiner*—Fred H Mull
(74) *Attorney, Agent, or Firm*—Law Office of Thomas E. Schatzel, P.C.

(57) ABSTRACT

A wireless handheld GPS-enabled device and supporting system comprises a wireless CPU that functions as a host processor, a GPS chipset to provide GPS measurements, and a GPS application hosted by the wireless CPU. Other applications are also hosted by the wireless CPU and are provided with position solutions from the GPS application. The GPS application calls for GPS aiding information from an Internet server via a TCP/IP socket provided by a GPRS link supported by the wireless CPU. Location area identifier (LAI) and "breadcrumb" information are provided to the GPS application so it can skip having to make a z-count determination during initialization.

8 Claims, 5 Drawing Sheets

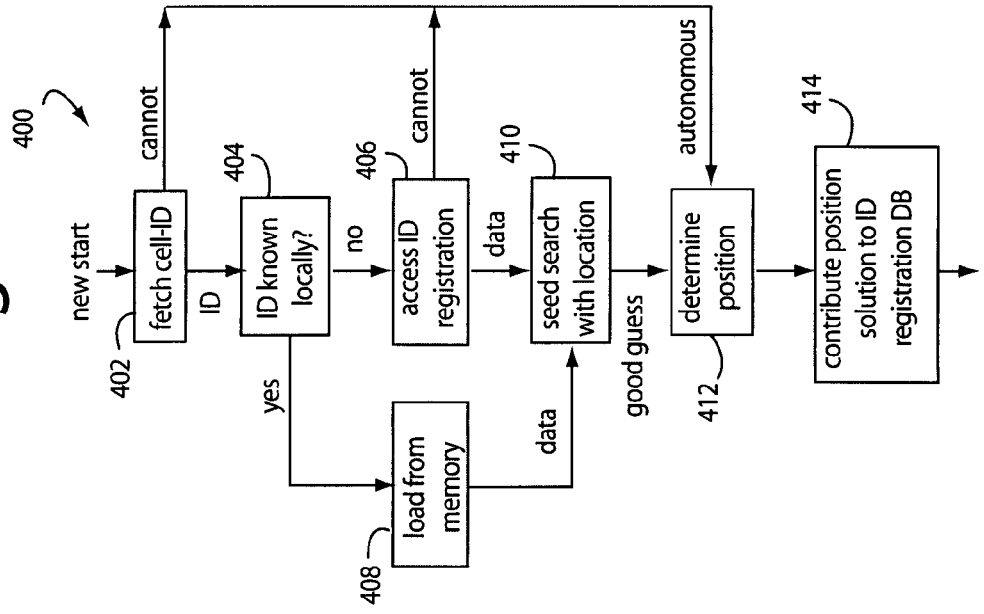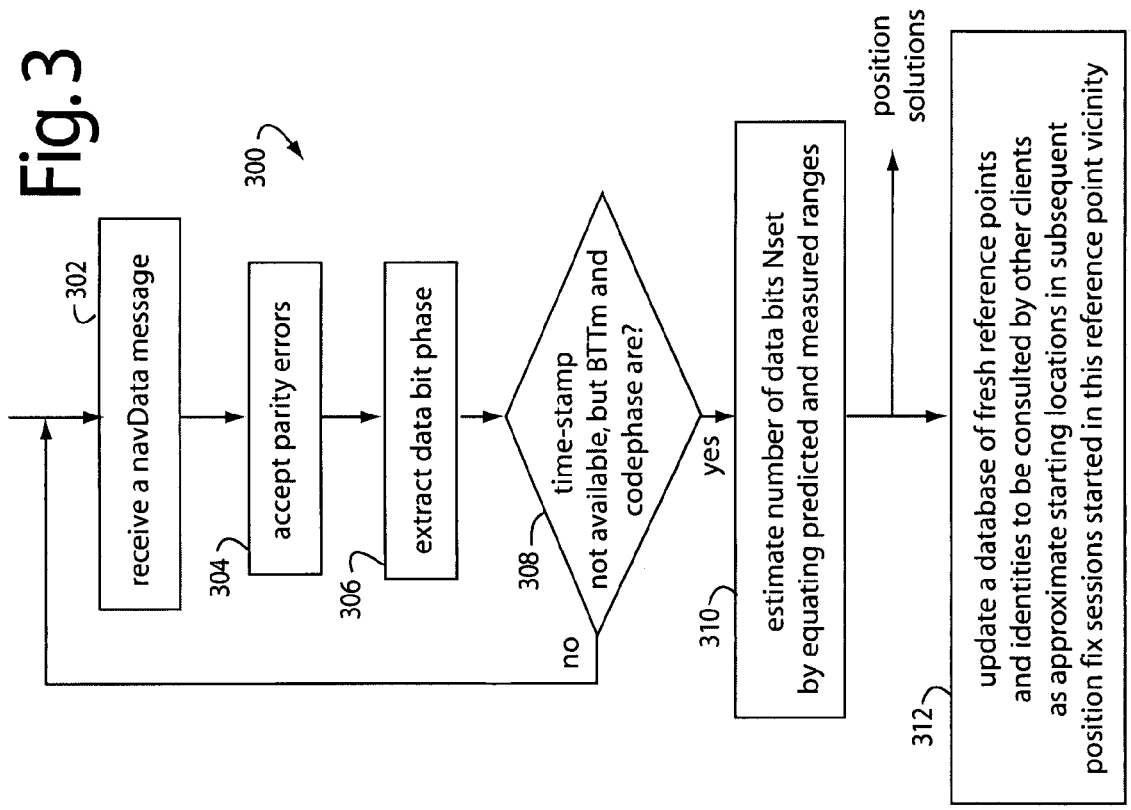

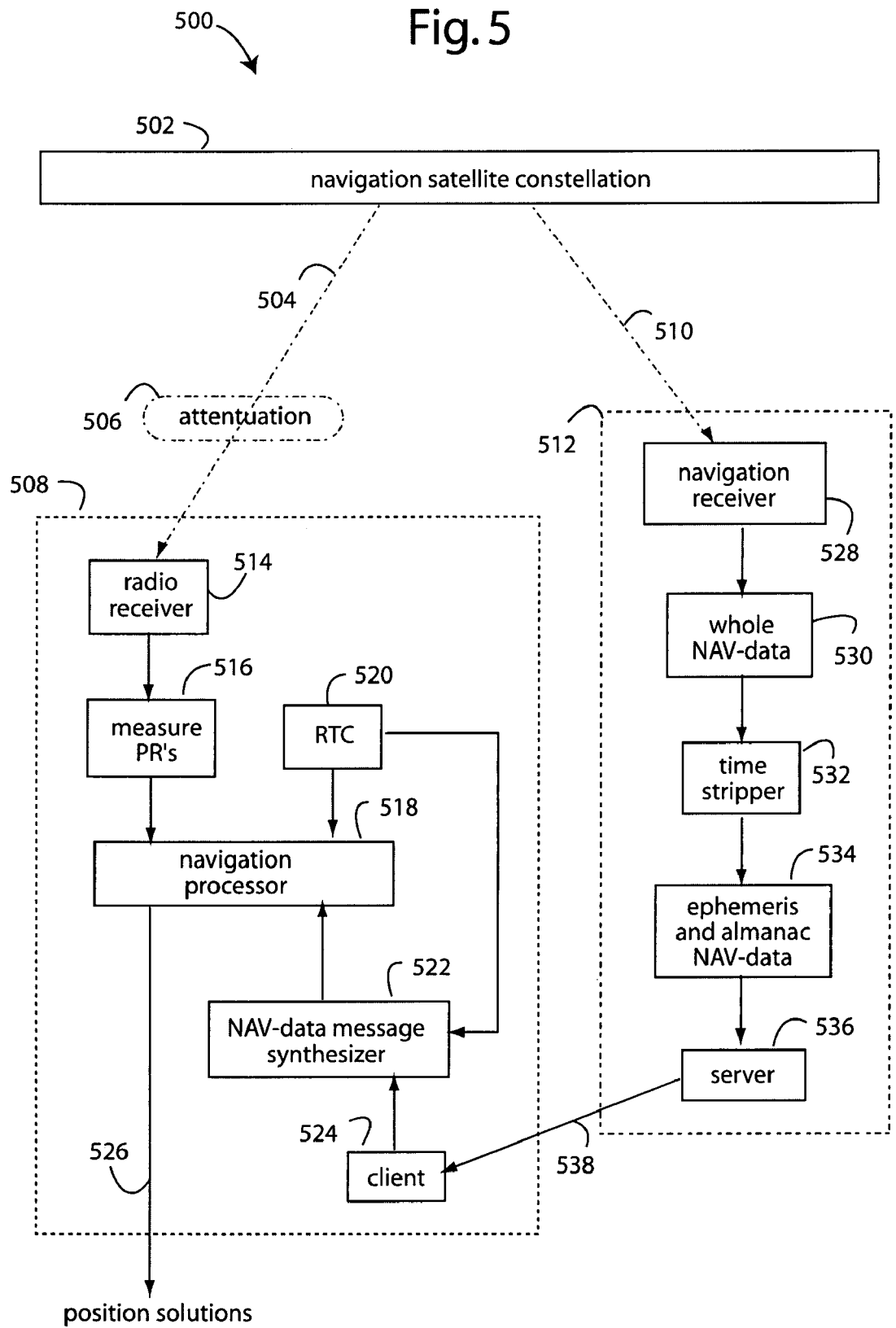

WIRELESS CPU GPS APPLICATION

FIELD OF THE INVENTION

The present invention relates to global positioning system (GPS) receivers, and more particularly to portable wireless devices with host processors running many applications including GPS.

DESCRIPTION OF THE PRIOR ART

Mobile, portable GPS receivers are often turned on after many hours or days of being turned off. And when they are turned on, the users expect immediate results. But the receivers can be in a very different place than they were during the last position fix. Portable GPS receivers can produce much quicker initial position solutions, and save precious battery power, if they are immediately provided satellite model data, a close estimate of time, and the current general location.

If the rough location information is good to within half of the pseudorandom noise (PRN) codephase propagation distance, e.g., 150-km, then the integer ambiguities in the z-count do not have to be solved immediately, and the GPS-millisecond system-time will be available. The initial carrier frequency search can then proceed quicker because the right satellites to search for will be known from the start, and the Doppler assumptions will prove to be correct.

If relevant satellite model information can be provided other than having to extract it from the rather slow Navigation Message transmitted by the orbiting GPS satellites, a great deal of time initializing the receiver can be saved. In the case of very weak reception areas, it may not even be possible to demodulate the Navigation Message, so getting the information some other way can enable a high sensitivity mode of operation.

Externally supplied aiding information is conventionally being supplied via mobile telephones. So-called assisted-GPS (A-GPS) receiver technology allows the mobile phone infrastructure to track the locations of GPS handsets, e.g., for Federal e-911 rule compliance. A-GPS can also be used to make position solutions possible under more difficult satellite signal level conditions. The cellular network signal will typically be very strong in a small region around a cellular base station so a high signal-to-noise-ratio (SNR) can be guaranteed for reliable low bit-error-rate reception. Good signals can support high-data-rate signals for voice, Internet, or data services.

A conventional location positioning session starts with a request made by the mobile phone that is sent to the cellular infrastructure. The infrastructure can assume an approximate location for the A-GPS receiver because it will be close to a cellular base station with a known, fixed location. The data communications channel itself is used to communicate important satellite data which has been continuously collected by another GPS receiver beforehand. So the need to demodulate the navigation message data from the satellite itself is eliminated.

Some A-GPS devices take advantage of information obtainable from a cellular based infrastructure that would be useful in a GPS receiver. For example, an A-GPS receiver can be low cost and simple because it shares hardware and information between the cellular communication system and GPS receiver. It is not considered an autonomous satellite positioning system (GPS) receiver because the hardware can only measure the fractional part of the total range. It does not demodulate the GPS data message which includes the timing information needed to form a total pseudorange. Instead, it uses an estimated total pseudorange based on the known nearby cell station position. So it can only compute a relative position that is within a circle of the true position. Such has a radius that is one half the theoretical maximum fractional range. In the GPS case for example, the 1023-chip PRN sequence is one millisecond long, which is a ranging distance of roughly 300-km. So the working range is roughly ±150-km around the approximate location.

If the GPS receiver's clock offset from GPS time is not known, then the fractional range measurement is referred to as a fractional pseudorange because it contains the sub-millisecond portion of such clock offset. When the clock uncertainty grows to ±0.5-millisecond, then the relative positioning working range is reduced to only ±75-km because of an ambiguity of whether the addition of the clock bias rolls the fractional pseudorange by plus or minus one millisecond. Such effect is different on each satellite and occasionally it is impossible to resolve if the position error exceeds 75-km. However, in both cases of whether the measurement is fractional range or fractional pseudorange, the 75-km working range is more than the range to typical coverage of cellular base station.

Finding the codephase of the satellite transmissions requires the mobile GPS receiver hardware to test a range of hypotheses of the code phase and frequency of the pseudo-random noise (PRN) signal. Knowing approximate location and time, as well as having an accurate frequency reference and a way to predict the nominal satellite Doppler, will greatly reduce the number of codephase and frequency hypotheses needed.

A smaller search box means more time can be spent at each hypothesis. The luxury of being able to spend more time can be used to improve the signal-to-noise ratio (SNR). An improved SNR allows the signal to be found in more demanding conditions. Thus at each code and frequency hypothesis, an A-GPS receiver sums the in-phase and quadrature components of the down-converted signal before squaring to form power, and then sums power after squaring. This is called coherent integration followed by non-coherent integration. The variance of these sums decrease with integration time, allowing a power that is above the noise power average to be detected. The standard deviation plus noise average drops below the signal power.

Taylor, et al., U.S. Pat. No. 4,445,118, issued in 1984 (Taylor '118), describe aiding a GPS receiver with an approximate position of a nearby transmitter, e.g., a radio tower or satellite. A benefit of providing such externally sourced information is a faster acquisition time because of the improved starting guess of the satellite Doppler observed at this location. Taylor '118 teaches transmitting the information at a carrier frequency similar to the GPS satellite frequency so both signals can be tuned by the same receiver hardware.

Krasner, in U.S. Pat. No. 6,208,290, (Krasner '290) describes a similar position aiding scheme. A cell-based communication system has a GPS receiver effectively embedded into a cellular network. The aiding improvement is similar to that taught by Taylor '118.

SUMMARY OF THE INVENTION

Briefly, a wireless handheld GPS-enabled device and supporting system embodiment of the present invention comprises a wireless CPU that functions as a host processor, a GPS chipset to provide GPS measurements, and a GPS application hosted by the wireless CPU. Other applications are also hosted by the wireless CPU and are provided with position solutions from the GPS application. The GPS application calls for GPS aiding information from an Internet server via a TCP/IP socket provided by a GPRS link supported by the wireless CPU. Location area identifier (LAI) and "breadcrumb" information are provided to the GPS application so it can skip having to make a z-count determination during initialization.

An advantage of the present invention is that GPS position solutions are provided to other applications on a common host processor.

A further advantage of the present invention is that a modular structure is provided in which the module interconnections use standardized serial and AT-command interfaces that provide for easy porting and product migration.

These and other objects and advantages of the present invention will no doubt become obvious to those of ordinary skill in the art after having read the following detailed description of the preferred embodiments which are illustrated in the various drawing figures.

IN THE DRAWINGS

FIG. 3 is a flowchart diagram of a method embodiment of the present invention to extract data bit phase after accepting parity errors;

FIG. 4 is a flowchart diagram of a method embodiment of the present invention useful in the mobile clients of the system of FIG. 2;

Figure 6:
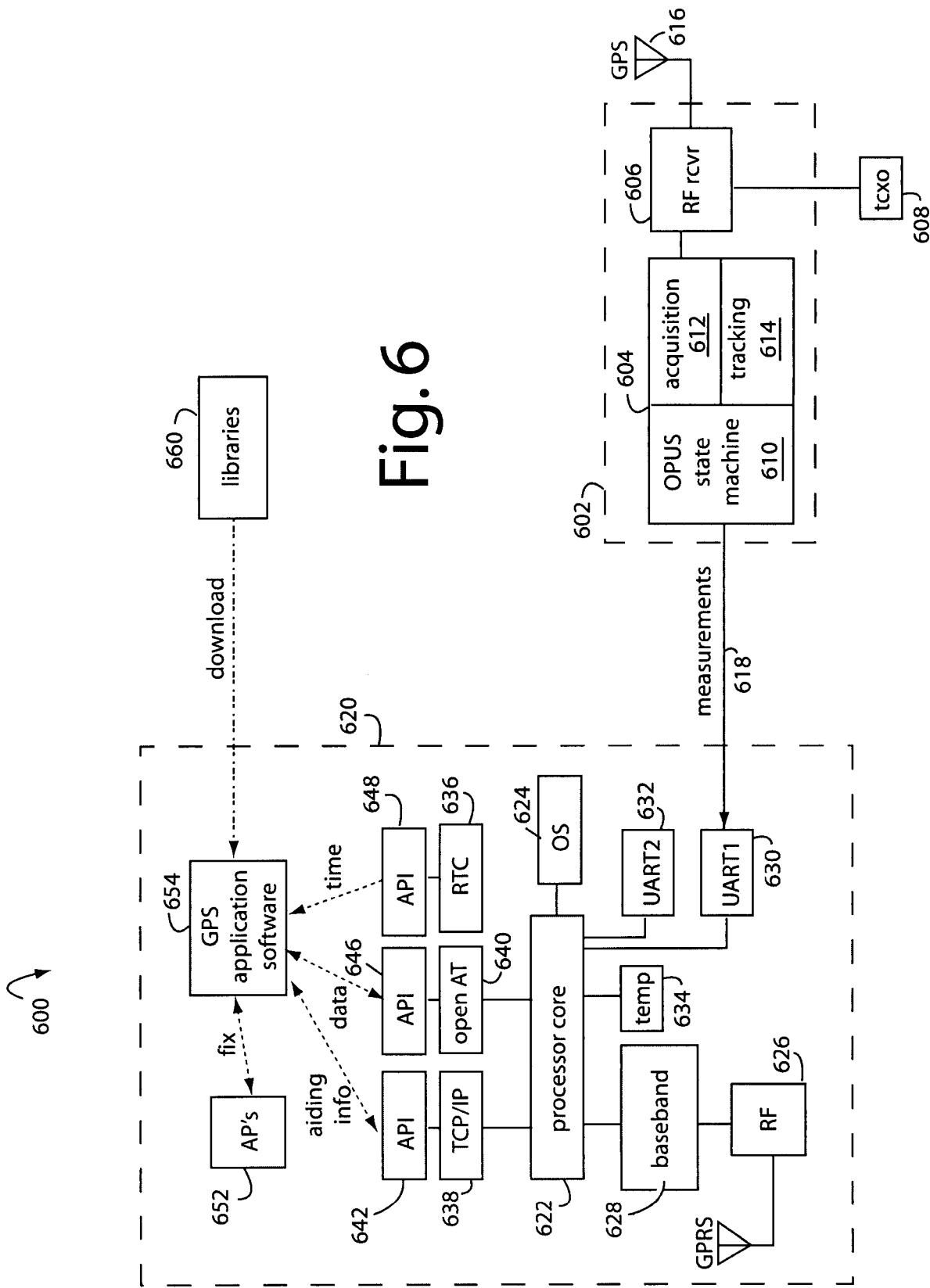

FIG. 5 is a functional block diagram of a server aiding a mobile client that is not able to demodulate the Navigation Message itself because of attenuation; and FIG. 6 is a functional block diagram of a commercially available wireless CPU that has been modified and programmed to receive GPS transmissions and compute position fixes from the GPS measurements, and that can use aiding information provided over a GPRS link to the Internet and a server.

DETAILED DESCRIPTION OF THE PREFERRED EMBODIMENT

Figure 1:
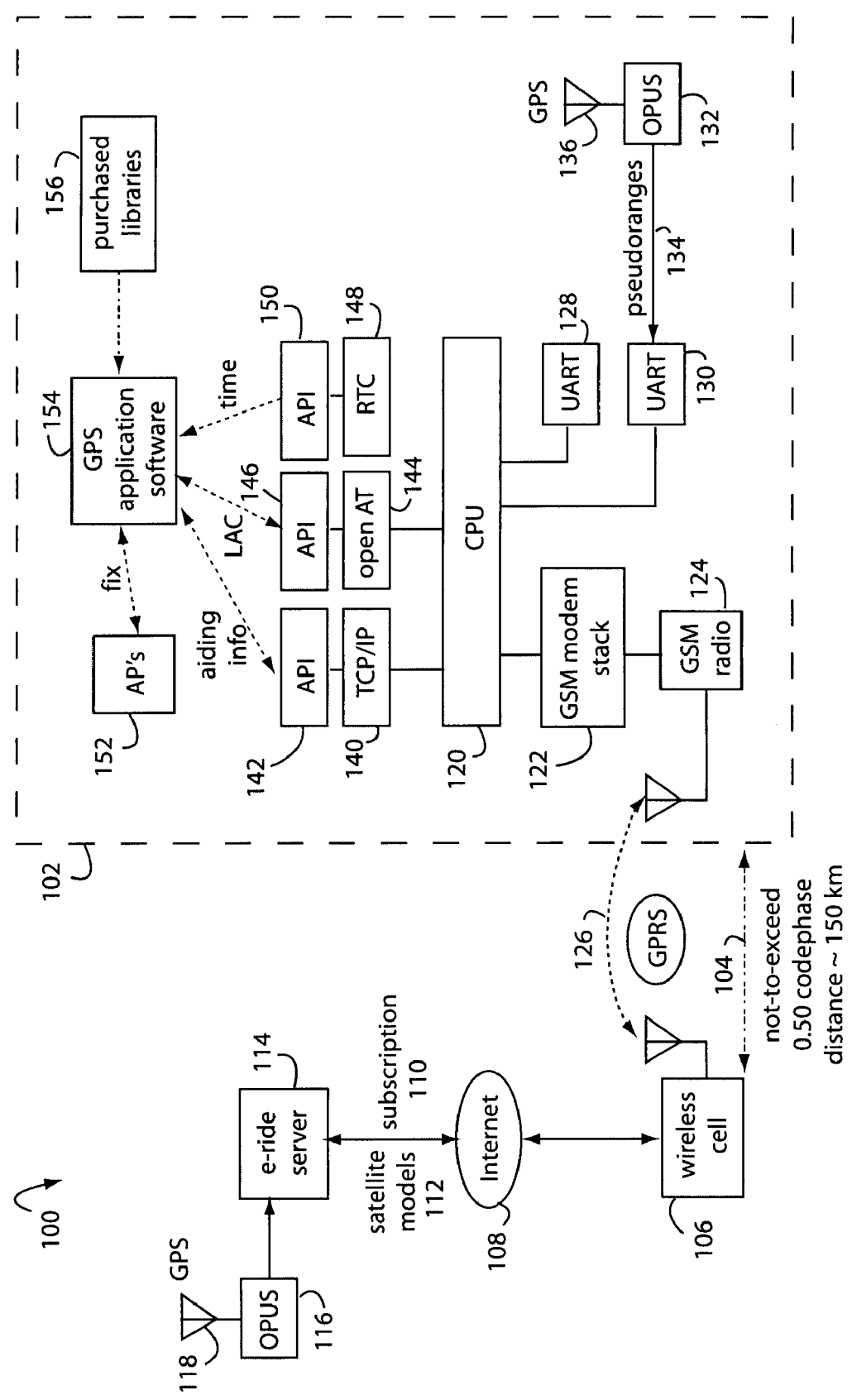
FIG. 1 is a functional block diagram of a system embodiment of the present invention.

FIG. 1 represents a mobile GPS-aiding system embodiment of the present invention, and is referred to herein by the general reference numeral 100. System 100 comprises a wireless handheld device 102 that operates within a not-to-exceed (NTE) distance 104 of a local wireless cell base station 106. The NTE distance is limited by one-half the codephase propagation distance of global positioning system (GPS) coarse acquisition (C/A) code satellite transmissions, approximately one hundred fifty kilometers (150-km). Such local wireless cell base station 106 is associated with a location area identifier (LAI) identifier that hints at its geographical position, e.g., "415" for San Francisco, Calif. The typical service area of a local wireless cell base station 106 is usually no more than fifty kilometers in diameter, easily satisfying the NTE distance 104. As the wireless handheld device 102 roams, it will find and work with the nearest of other local wireless cell base stations 106 that will have their own corresponding LAI identifiers.

System 100 further comprises an Internet connection 108 that supports a paid subscription log-in 110 and returns satellite models 112 for aided-GPS operation of wireless handheld device 102 in weak or poor GPS signal reception locations. Such models may be compacted into polynomials that very much shorten the data that needs to be communicated and simplifies the job of calculating the GPS satellites' instant orbital positions. Therefore, the ephemerides and almanacs are not sent as is the usual practice in conventional equipment.

A satellite model server 114, e.g., as provided by eRide, Inc. (San Francisco, Calif.), uses LAI identifiers associated with wireless cell base station 106 to provide corresponding long-term and short-term satellite models suited to the geographical area in which wireless handheld device 102 is operating. Full time, accurate GPS system information about the constellation of orbiting GPS satellites is collected at strategic locations, e.g., by a GPS receiver 116 and a GPS antenna 118. Such GPS antenna 118 has a good view of the constellation and receives a strong signal that provides GPS navigation messages.

The wireless handheld device 102 comprises a host microcomputer (CPU) 120 provided with a GSM modem stack 122 and GSM radio 124 to support GPRS data communications 126. A pair of universal asynchronous receiver transmitters (UART's) 128 and 130 provide general serial interfaces. UART 130 is connected to a GPS chipset 132 and receives pseudorange measurements 134 taken with a GPS antenna 136. Such GPS antenna 136 typically operates in poor reception areas that may not provide a strong enough signal to enable demodulation of the GPS Navigation Message. Correlation gain techniques, however, can nevertheless provide good pseudorange measurements.

The CPU 120 is further provided with a TCP/IP socket 140 and its application programming interface (API) 142, an AT-type modem command controller 144 and its API 146, and a real time clock (RTC) 148 and its API 150. The API's 142, 146, and 150 provide machine independent interfaces for a variety of downloadable application programs (AP's). A typical AP 152, like an automobile navigation system, is provided position, velocity, and time fixes from a GPS navigation receiver application program software 154. Such can be purchased and downloaded as a library 156.

In operation, GPS navigation receiver application program software 154 requests and receives GPS aiding information over the Internet 108 from GPS-aiding server 114 via API 142 and TCP/IP socket 140. LAI's from wireless cell base station 106 are provided to GPS navigation receiver application program software 154 in response to AT-type modem commands via API 146 and controller 144. Time estimates accurate to within one millisecond are provided from RTC 148 via API 150.

The GPS chipset 132 typically includes a commercial product marketed by eRide, Inc. (San Francisco, Calif.) under the OPUS trademark. eRide's OPUS Plus GPS/A-GPS baseband ASIC provides high sensitivity and a simple integration for GPS-enabled products with autonomous as well as assisted-GPS (AGPS). Compatible devices for the eRide RF+baseband two-chip GPS product include wireless handsets, PDAs, vehicles, watches, and cameras. GPS location accuracy (<20 m) can be provided indoors and in urban canyons without repeaters.

Integrating an OPUS Plus ASIC in a host device requires minimal resources, e.g., a dedicated serial port to a host CPU, less than six million instructions per second (6-MIPS) of processing on the host CPU 120, a small footprint (9×9 mm BGA package), and minimal software on the host CPU (124 Kbytes of ROM/Flash, O/S independent). All memory is managed directly on the OPUS Plus. A small C-client code core and application programming interface (API) allow for porting to any host CPU. The Opus Plus takes near zero-IF I and Q (2-bit sign and magnitude) from the GPS RF ASIC for GPS processing and communication with the host CPU where the final position, velocity, time (PVT) solution is calculated. The OPUS Plus ASIC includes an Opus State Machine (OSM) to manage code/frequency hypothesis generation/correlation and interfacing between the hardware and all peripherals. A Firmware State Machine (FSM) includes an Indoor State Machine (IDSM) for high sensitivity acquisition and tracking block searching and tracking with sensitivity to minus 155 dBm; An Outdoor State Machine (ODSM) for searching all thirty-two GPS satellites with −142 dBm sensitivity without intervention from the host CPU 120; and, a Time-Tracking State Machine (TSM) for collecting navigational data and providing synchronous measurements so that GPS time and navigation data can be decoded and utilized without host CPU interrupts. The Opus Plus ASIC has 44,000 effective correlators used to search all thirty-two satellites at several time/frequency hypotheses. It can search thousands of time/frequency hypotheses for a few satellites (SV's). Search windows, time/frequency hypotheses, are configurable for each SV. An AT-cut crystal (XO) is normally used by the GPS RF ASIC and the OPUS Plus ASIC to provide stable frequency information without the need for a temperature controlled crystal oscillator (TCXO).

The value of having an RTC able to narrow time uncertainties down below ten seconds, and the 150-km limitation for NTE distance 104, are taught by the present inventor, Paul McBurney, and Stephen Edwards in U.S. Pat. No. 6,670,916, issued Dec. 30, 2003, and titled, METHOD AND SYSTEM FOR POSITION CALCULATION FROM CALCULATED TIME. Such is incorporated herein by reference.

Because the receiver and satellite clocks are not perfectly synchronized, such clock offset acts as an error on the distance to the satellite. The apparent distance is called the "pseudorange" (PR). The clock error can be computed by assuming all the pseudoranges to the different satellites will have the same clock offset in one measurement epoch. So four satellites are needed for a position fix, three for latitude, longitude and height or (X, Y and Z), and one for the clock offset.

Two different-length modulating codes are transmitted on two microwave carriers by the orbiting GPS satellites. The two carrier wavelengths are nineteen and twenty-four centimeters, respectively. The precision (P) code is available only to authorized (military) users and does not have any ambiguity because its length is about 181,440,000,000 km, the distance traveled by light in one week. The coarse acquisition (C/A) code is much shorter and repeats every 300 km of radio wave propagation distance, so observations outside a range of 0-300 km can be ambiguous. Since the distance to a satellite is typically 20,000 km, which 300 km segment the receiver is in needs to be determined. This is called an integer ambiguity.

The Z-count is a 17-bit binary number that represents a fundamental GPS time unit. The ten most significant bits carry the GPS week number, and the nineteen least significant bits give the time of week (TOW) count in units of six seconds. A much finer gauge of the system time is available once the receiver locks onto a few satellites. Prior art devices have depended on determining the z-count during initialization.

Before GPS carrier phase observables can be used for positioning, the integer ambiguities must be resolved. The phase measurement is translated into a distance measurement.

Conventional estimation techniques cannot solve the receiver coordinates, the clock offset and the integer ambiguities in one epoch of data, for all the satellites observed. Collecting a few epochs of data doesn't help much. Although there are enough equations, the problem is insoluble, since the satellite's geometry with respect to the receiver is not usually sufficiently favorable. The integer ambiguity values can only be determined after a significant change in the geometry, unless an on-the-fly (OTF) technique is being used.

A resident or visiting GPS receiver can be used to keep a running log of the z-counts and GPS Doppler shifts in a particular service area under 150-km in diameter. These estimates can be provided to uninitialized GPS receivers roaming in that service area. The 150-km limitation is a function of the z-count. Half of the PRN pseudocode propagates over a distance of 150-km, because it repeats every millisecond.

From a cold start, an uninitialized GPS receiver has to first be able to find the transmitted signal from the orbiting GPS satellites, and then it has to decode the signals to compute a first fix. Knowing the Doppler shifts existing in the local neighborhood is useful in reducing the carrier frequency uncertainty connected with particular satellites. So the carrier signal can be acquired much sooner. The Doppler aiding information helps the cold-starting receiver find signal without having to acquire exact time and approximate location so it can figure out from the almanac which satellites are supposed to be visible and their relative velocities.

However, the C/A-code transmitted by each satellite repeats every millisecond. So the number of milliseconds the signal uses to propagate to the receiver is called the integer millisecond range. The remaining fraction of the last integer millisecond range and the code phase together constitute the pseudorange. The computational problem is called the integer ambiguity, and maximum likelihood tree searches are typically used to resolve such ambiguity and can take substantial time.

So it helps if the z-count is already known. The respective z-counts from each visible satellite to the target receiver can be assumed to be the same as the z-counts to the server if the two are not separated by more than the magic "150-km". This is because the speed of C/A-code signal propagation through space is about 299,792,458 meters per second, or 299.792 kilometers per millisecond. The correct integer millisecond will be obvious over a range of half that distance, e.g., 150-km.

The present inventor describes ways to skip the z-count search in U.S. Pat. No. 7,123,190, issued Oct. 30, 2006, and also 7,019,689, issued Mar. 28, 2006. A navigation-satellite receiver with a high-sensitivity radio frequency front-end and navigation processor is associated with a client CPU. The client CPU runs an operating system that serially communicates with the navigation processor. The client CPU is also able to obtain navigation data system transmissions from a network server and provides such when the direct satellite signals in the high-sensitivity environment are too weak to be demodulated directly. A low power, low frequency oscillator with a watch-type crystal and counter are used as a real time clock to keep time uncertainty under fifty milliseconds when the receiver is hibernating. If the time uncertainty and position uncertainty are below certain maximums when the receiver is re-awakened, then a minimum number of satellites will be needed, and measuring a preliminary z-count to each satellite can be avoided.

U.S. Pat. No. 6,670,916, issued Dec. 30, 2003, details how embodiments of the present invention can use fractional pseudoranges to find position solutions. The full integer millisecond is not initially available because there is no means to compute it without bit transition time (BTT) or the Z-count, and so the full pseudorange will be unknown.

The way GPS-aiding server 114 is used to help speed up and improve position solutions by wireless handheld device 102 is described in detail by C. Rypinski, et al., in U.S. Pat. No. 6,647,339, issued Nov. 11, 2003. A plurality of GPS reference stations are distributed in different parts of the world so as to be able to simultaneously gather a complete set of satellite vehicle ephemerides. Each reference station is associated with a network server connected to the Internet. Each network server posts ephemerides, NAV-data, and other useful information for clients derived from its corresponding reference station. All such network servers inject their information in all the other servers in the system Each server validates and authenticates any injected data. Each client is also qualified as a subscriber before being able to access the complete ephemerides database and other GPS system information.

The way satellite models 112 are used to support position fixes in wireless handheld device 102 is described in detail by the present inventor in United States Patent Application US 2005/0278116, published Dec. 15, 2005. A navigation satellite receiver accepts satellite-position table messages comprising truncated GPS ephemeris parameters. In particular, at least one of the two harmonic corrections to inclination angle, Cic and Cis, are not communicated and not used in the solution of navigation receiver position. In a first method embodiment of the present invention, both the two harmonic corrections to inclination angle, Cic and Cis, are omitted from the computation. In a second method embodiment of the present invention, only one of the two harmonic corrections to inclination angle, Cic and Cis, are omitted from the computation, depending on $\text{Min}(C_{is} \sin(2\phi_k), C_{ic} \cos(2\phi_k))$.

The way satellite models 112 use polynomials and their coefficients to support position fixes in wireless handheld device 102 is described in detail by the present inventor in U.S. Pat. No. 6,701,253, issued Mar. 2, 2004. A navigation-satellite receiver network comprises a server connected to the Internet to provide real-time correction information to clients. The server includes a GPS receiver that provides for tracking of a constellation of navigation satellites. When a client is online, it can receive satellite position and velocity information in the form of a polynomial and coefficients. Clock, ionosphere, troposphere, and other corrections are all bundled into one polynomial. The client therefore never needs to receive the almanac or ephemeris from the server.

The way RTC 148 is used to supply time and help speed up and improve a first fix is described in detail by the present inventor in U.S. Pat. No. 6,714,160, issued Mar. 30, 2004. A navigation-satellite receiver comprises a real-time clock that can be slaved to the highly accurate time base of the GPS system. During such times, the amount of correction and the operating temperature are both tracked. It is assumed the operating temperature will have the greatest influence of frequency errors later when the real-time clock cannot be slaved to the GPS time base. When the receiver is powered-down, the real time clock is nevertheless kept alive. Its free-running frequency is corrected for temperature. The next time the receiver is powered up, time accurate to better than one millisecond in a day can be obtained instantly for use in other receiver initialization procedures.

The way time from RTC 148 and the LAI identifiers constrained by the NTE distance 104 are used to speed up and improve a first fix is described in detail by the present inventor in U.S. Pat. No. 6,670,916, issued Dec. 30, 2003. A two-dimensional grid of points is setup with constant altitude that represents solution starting points within the 150 kilometer area. Fractional pseudoranges from each satellite in a constellation are inspected for a best initial fit with the points in the grid. A variety of time bias adjustments within the time bounds are also tried against the points to find a best fitting point. That point then is used in a drive to find the final solution and to produce the first fix from cold start.

"Breadcrumbs", or hints about where one is, are left and used by wireless handheld devices 102 to obtain fixes faster. How these operate is described with FIG. 2 which represents a mobile GPS-aiding system 200. System 200, in one instance, comprises a GPS reference receiver 202 located anywhere to collect GPS navigation (NAVdata) messages 204 from constellations of orbiting navigation satellites 206. Each NAVdata message 204 comprises 2500-bits broadcast by each satellite at 50-bps on both the L1 and L2 carrier frequencies. Such broadcast includes GPS system time, clock correction parameters, ionospheric delay model parameters, the satellite's ephemeris, and it's health. The information is used to process GPS signals to obtain user position and velocity. It is also used when processing precise surveying data.

A GPS-aiding data network server 208 is subscribed to, e.g., by paid users in a business method embodiment of the present invention. Users on the Internet 209 are provided with distillations and repackaged ephemeris data 210, 212, gleaned from the navigation messages 204, e.g., and transported by TCP/IP, GPRS, IP, etc. A number of commercial broadcast radio stations 212, 214 are opportunistically used to publish such ephemeris and almanac data on particular sub-carriers 216, 218, e.g., FM radio broadcasts with radio data system (RDS), digital audio broadcasting (DAB), DBM, etc. The FM radio broadcasts are respectively limited to service areas 220, 222. Such practical limitations allow a mobile GPS receiver 224 operating within these service areas to assume it is within one-half of the PRN codephase propagation distance of the corresponding commercial broadcast radio station 212, 214. This is important because any GPS receiver operating within the service area 220, 222, will probably be the same integer number of codephase counts (the z-count) away from the satellite as is the local radio station 212, 214. Only the fractional codephase needs to be measured to find the corresponding pseudorange.

If the location of such corresponding commercial broadcast radio station 212, 214, has been previously logged into a breadcrumb database 226, then accessing that database will allow the mobile GPS receiver 224 to skip solving the integer ambiguities to find a working z-count and integer millisecond. If the location of such corresponding commercial broadcast radio station 212, 214, has not before been logged into the breadcrumb database 226, then the mobile GPS receiver 224 will contribute such data after it goes to the lengthy trouble of finding a position solution on its own. Such breadcrumb referred to herein is reminiscent of the Hansel and Gretel fairytale story where the children dropped breadcrumbs to help find their way back home.

A number of vehicles 230-232 are equipped to receive commercial radio broadcasts, e.g., with sub-carriers 216 and 218. These specially equipped vehicles 230-232 have matching FM radio receivers that can decode the sub-carriers 216 and 218, and are used to haul the NAVdata 210, 212. These FM radios are further able to retransmit the information via Bluetooth piconets locally to the mobile GPS 224. (For the Bluetooth Specification, see, www.bluetooth.com/bluetooth/.)

Each piconet allows visiting portable devices to ad-hoc connect via Bluetooth technology to a master, e.g., the vehicle 232. For example, the 2007 Mercedes-Benz S550 cars are equipped standard with similar Bluetooth piconets. A piconet starts with two connected devices, such as a portable PC and a mobile phone. Bluetooth devices are peer units and have identical implementations. But, when establishing a piconet, one unit will act as a master for synchronization purposes, and the other units will be slaves for the duration of the piconet connection.

Such mobile GPS 224 can be integrated with the AM/FM radio, cellphone, satellite radio, and a navigation system, e.g., into the Mercedes-Benz COMAND system. The operational result is mobile GPS 224 that can initialize quicker and operate in areas with very faint GPS signal levels, such as commonly occur in heavy forests and cities with tall buildings.

Other mobile, portable GPS receivers 234, 236, operated near any of the vehicles 230-231, may be able to receive Bluetooth transmissions with the aiding information.

Vehicle 231 is represented here as not presently receiving FM transmissions, but it could have nevertheless stored the ephemeris and almanac data, together with the identity of the radio broadcast station tuned. If the data is not too stale, it could supply Bluetooth transmissions of aiding data and supply its own computed position solution for a breadcrumb to near-enough mobile GPS units 224, 234, 236, etc. An ad-hoc Bluetooth link mechanism is used to make the connections as the opportunities arise.

The breadcrumb database 226 is used to index the locations of the radio broadcast stations. Each mobile, portable GPS receiver may contribute to such database after it computes a location fix, e.g., via GPRS on a cellphone network. If the location of the radio broadcast station is already known to the database 226, then the breadcrumb location can be accessed and used to speed up the finding of a position solution by the mobile, portable GPS receiver itself.

A method of operating the mobile client 224, 234, 236, for extending its capabilities is first to obtain the most timing information possible from the GPS signals, even in weak signal conditions, in order to fix autonomously with the highest level of uncertainty in its starting position. Secondly, when it is able to fix, it updates a database of fresh reference points and identities. These are thereafter used as approximate starting locations on subsequent fix sessions started in the vicinity of the same reference point.

Figure 2:
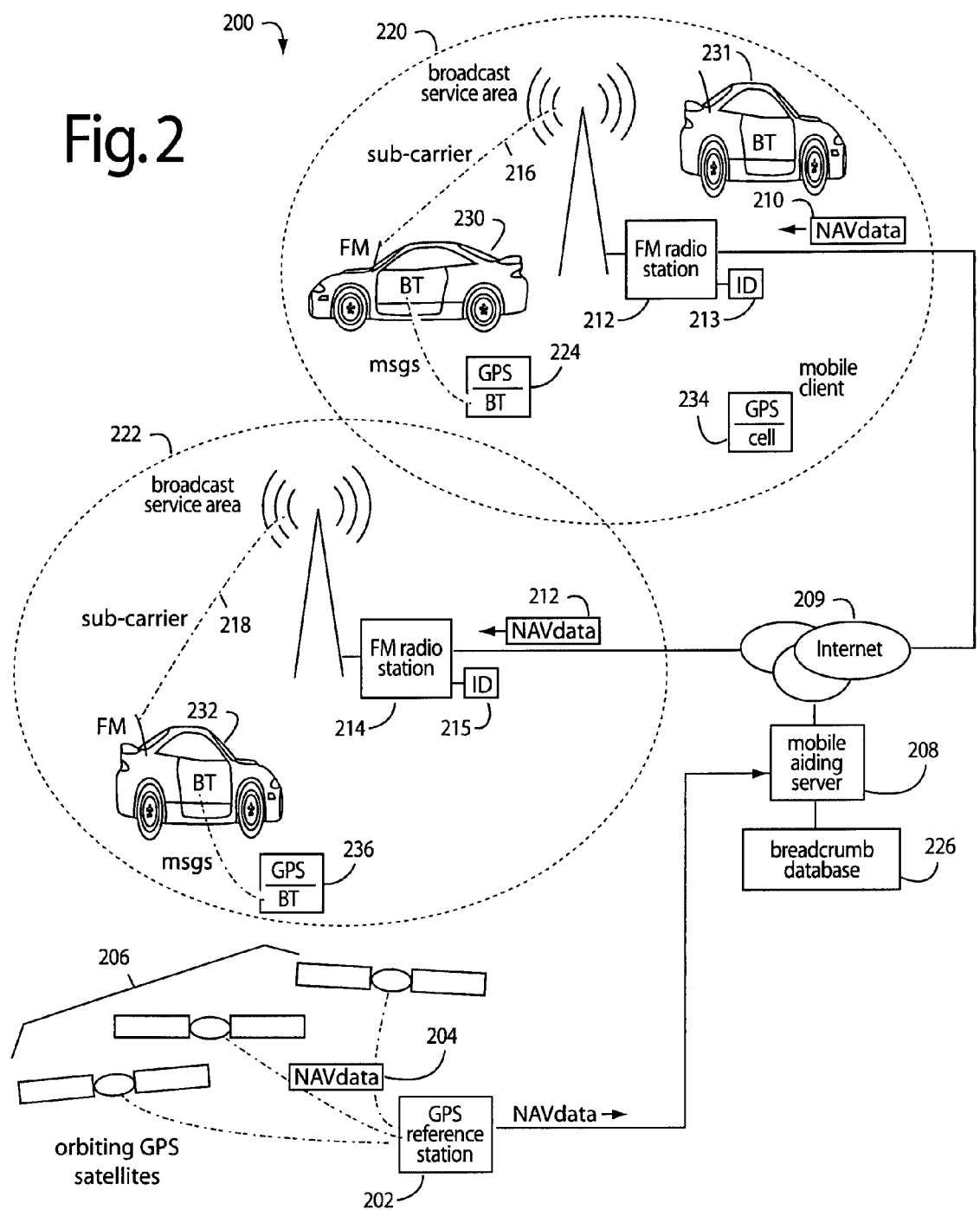
FIG. 2 is a functional block diagram demonstrating the use of "breadcrumbs" in mobile radio embodiments of the present invention.

FIG. 3 illustrates such a method embodiment of the present invention, and is referred to herein by the general reference numeral 300. The method 300 attempts to receive and demodulate the NAVdata message in a step 302. A step 304 accepts any parity errors that may be occurring, e.g., due to weak signal conditions. A step 306 extracts the data bit phase. A step 308 sees if the BTTm and codephase are nevertheless available. If they are, a step 310 estimates the number of bits Nset by equating predicted and measured ranges. Position solutions can then be produced. A step 312 updates the database, e.g., breadcrumb database 226 (FIG. 2).

FIG. 4 represents a method embodiment of the present invention, and is referred to herein by the general reference numeral 400. The method 400 is implemented as software on mobile clients 224, 234, 236. A step 402 begins with the mobile client trying to obtain an identification (ID) code from the cell base. If an ID is obtained, it can be used as an index to a database of previously determined positions. A step 404 checks to see if the need for a particular ID and its associated aiding information were anticipated and preloaded in local memory. If not, a regional, national, or worldwide database needs to be consulted. A step 406 attempts to log-onto the Internet 206 and access server 208. If the log-on is successful, database 226 is indexed with the ID. If a mobile client 204 had previously computed a fix, then database 226 will have it to supply the request of mobile client 224, 234, 236. A step 408 supplies a locally stored aiding information. A step 410 uses the data fetched to seed a signal search. A step 412 determines position, either autonomously or with help. If the aiding information is accessible, then the step 412 can proceed to provide a result more quickly and at higher receiver sensitivity. In any event, a step 414 contributes the position solution obtained to the database 226 for use later by others, or its own revisit. It may be worthwhile for a mobile client 224, 234, 236, to store all the aiding information locally it too has generated, on the assumption it is likely to revisit places it has been before.

Typically, a mobile client 224, 234, 236, can communicate with many cellular base stations, the cellular switching system controls which cellular base station is used at a particular time. Additional information inside the network can be used to predict the approximate location more accurately than with a single cell site in the approach. The strongest signal is not always the closest, e.g., due to obstructions or because the closest tower is busy. But this information can nevertheless be used by the cell-based information system. The actual cell site positions can be defined more accurately by the cellular infrastructure, since it knows the exact location of the towers. It can derive an accurate position from a survey or a map. Other GPS receivers with access to cell-based information sources use methods for faster and lower power consumption position session. These take advantage of the cell site density in producing a more accurate approximate position.

System 200 can be less accurate in providing the approximate locations, compared to those obtained directly from an information system. As a result, it employs a more demanding and complex relative positioning method to manage a potentially large position uncertainty. In the prior art approach, the position uncertainty is always minimal because it only attempts a fix when it is in contact with a cellular base station where the position is assumed to be accurately known. However, because the GPS receiver 202 is autonomous, and is required to have extended GPS capabilities, any degradation in the approximate location associated with the cell site can be managed. The highest sensitivity positioning can be maintained, as long as it operates where it or other extended-GPS (eGPS) receivers have operated in the past.

The system 200 may require stronger signals in a new area to get its very first fix, but will thereafter improve its sensitivity as long as it can remember this station-ID and the position it computed.

Each receiver uses a conservative error growth calculation to estimate a worst case error in the parameters. For short periods of off-time, the error grows according to an acceleration model. For consumer applications, an acceleration a=0.25 to 0.5 g (where g=9.81 m/s/s) is a reasonable value. Constant acceleration is reasonable until the velocity growth hits the worst case velocity (maxUserVel) which is a parameter tuned for the particular application.

Thus, until maxVel is reached, $VelUnc = FixVelUnc + a*dt$ $Punc = PfixUnc + 0.5a*dt*dt$ Where $dt = t(\text{now}) - t(\text{last fix})$ After maxVel is reached, $VelUnc = maxUserVel$ $PosUnc = Punc(maxVel) + maxUserVel*dt$ Where Punc(maxVel) is the value of the position uncertainty when the maximum velocity was calculated.

A similar model is made for the time and drift uncertainty, $DriftUnc = DriftFixUnc + driftRate*dt$ $BiasUnc = BiasFixUnc + \text{integral}(DriftUnc)$ Where driftRate is a function of the stability of the oscillator with time, and the time uncertainty integrated this value. If a temperature sensor and a drift verse temperature model are available, the error growth rate for the drift and bias uncertainties can be modeled.

Data in a worldwide reference point database 226 is accumulated over time in a business model embodiment of the present invention. By sharing computed positions and station-IDentities (ID's) with the position registration server 208, a worldwide set of reference points can be constructed. Such provides each mobile client 224, 234, 236, with high sensitivity position capability in any cellular network where a station-ID is readable in the available in the unprotected communication protocol. Other forms of identifying the radio station 212, 214, could be acquired or registered.

Initially the position registration server 208 starts with no database of reference points, e.g., breadcrumbs. Such record a place that has been encountered before. When product shipments begin to new clients, the receivers will have an empty database 226. However over time, such mobile clients 224, 234, 236, compute autonomous fixes and begin to communicate periodically with the position registration server 208.

As part of a setup procedure or a pre-travel preparation, a client receiver can connect to the position registration server 208 via the Internet. A simple selection process is used to request reference points for places it intends to operate, such as places near a primary residence or places it intends to visit. In the early phase of a product roll-out, such requests will not yield a great number of points in response. However, over time; as the number of autonomous fixes performed in the mobile client 204 in the field grows, and more points of interest are defined, the position registration server 208 and database 226 will also grow to be quite extensive.

As a business model method to grow the position registration database 226 faster, a contest can be used that motivates clients to operate their GPS receivers in conditions that allow reliable autonomous location determination and then to log-on periodically to the position registration server 208 to share their points. They are rewarded more for being the first client to operate in a new region and provide the information to the position registration server 208. They are rewarded proportionally less when they provide information for points already supplied but yet still help to improve the accuracy of an aggregate position supplied by other contestants for a given station-IDentity or breadcrumb. Once that position estimate has converged to a satisfactory non-varying average, the contest for that station-IDentity or breadcrumb is closed.

Thus, just as a mobile phone can store phone numbers, it can store breadcrumbs of places it wants to go or has been. Algorithms for minimizing the number of breadcrumbs are implemented in the client to minimize the amount of memory required. For example, a single position may have a long list of station-IDentifiers that are within a tolerable range of the position so that the breadcrumb position is within 75 or 150-km of the true position. The goal is to store one position that contains the most station-ID's within that region. Such is common when there are many Station-ID's coming from the same cellular base station. If the client reads a new station-ID a short time after computing a fix, it can associate the new station-ID with the previous fix and also create an uncertainty for this station-ID which is the uncertainty of the previous fix plus the uncertainty growth due to receiver movement since the fix. In this way, the receiver does not have to be fixing continuously, but the modem can continue to interrogate for new station-ID's.

Similarly, the station-ID's may not always be completely unique in a worldwide sense. The position registration server 208 hosts algorithms that manage the master database 226. It is possible to have more than one of the same ID's, but generally they will be in different geographic regions.

If a client enters an area for which is has no breadcrumbs, it may be able to do an autonomous position and therefore create a new breadcrumb at the current station-ID that it can subsequently share with the position registration server 208. If it is not possible to fix, it can send the current station-ID to the position registration server 208. It also sends along its most recent position, time tag, station-ID, and the current configuration for the maximum velocity it can experience in normal operation. If the server 208 has that ID and it is unique, then the server can confidently send the position for this station-ID to the client 202 along with a configurable number of additional breadcrumbs around this area. The number depends on the time till next communication. If the client requests often, only a few breadcrumbs around the current one are needed. If the client requests rarely, a larger reply may be sent. In a constant-on operation, the server could send the points surrounding the current location and the client can continuously trim the previous breadcrumbs to minimize the storage.

If the ID is not unique, the server can check the position for reasonableness of being in proximity of the multiple positions in memory for this ID. The maximum distance that can be traveled since the last fix can be calculated and represented as a circle around the last position. As an even more conservative check, the speed of the fastest executive jet can be used to predict the maximum range for the last position. If this circle can be used to identify the obvious position for the redundant station-ID, then the client is sent the breadcrumb. However, if there is ambiguity, the server will not reply with a position and the mobile client 224, 234, 236, will be required to do an autonomous fix or wait for the signal conditions to improve.

An ambiguity between two possible station-ID locations can be resolved by looking at the last fix and deciding which is nearest. The nearest is most likely correct.

$$DelPos=maxVel*(timeNow-timeFixAtCellID1)$$

Location area codes change much slower. The range covered by an location area code is much larger. In one case, a location area code was valid for 286-km=215-miles. The one sided range is about 58 miles or 93-km.

In embodiments of the present invention, the approximate position in a GPS system never comes from the cell-based information source, e.g., in contrast with the cellular network described in prior art. Instead, it comes via the Internet from server 208 that is independent of cellular network provider. It cannot access the cell-based information source known to the cellular network only. Furthermore, the position database is grown by the customer operation, not by the cellular network provider.

The preferred GPS receiver has many of the characteristics of a conventional receiver in that it can obtain all the timing information in the GPS data message. Like a conventional receiver, it can fix autonomously with no aiding information using the timing information in the data message to form a total pseudorange measurement. It also has the high sensitivity of an A-GPS receiver and can still extract the codephase below where the signal is too weak to extract any larger wavelength timing information from the signal. With the wavelength of the codephase at one millisecond, there is only ±0.5-millisecond (±150-km) of measurement observability of the total pseudorange which determines how far it can move the position estimate from the starting value. The extended GPS (eGPS) receiver can extend its fix range far beyond the 150-km radius in signal conditions where it is able to also extract the data bit phase of the data message, even when it might not be able to decode the data bits themselves without parity errors. With GPS, the 20-milliseconds wavelength of the data bit produces a half cycle ambiguity of ±10-millisecond. With this larger wavelength measurement, the range of position in weak conditions can be extended from the range of the codephase at 150-km out to 1500-km (940-miles) and beyond that from an approximate position.

Using breadcrumbs or reference points, the eGPS receiver bounds its starting position uncertainty and maintains high sensitivity fixing whenever it returns to an area where it has previously computed a position and can associate that position with an unique identifier that can be communicated automatically or by human intervention. The eGPS receiver builds its own database of reference points. Bread crumbs are collected at the position registration server 208 where they then can be shared with other eGPS receivers. Cellular communications cellular base stations are one such type of reference point since a cellular modem can generally read the station-IDentity in the normal communication protocols without using the cellular based information source.

The receiver should have a millisecond clock used as the reference for the codephase measurement. Its time error can be expressed as the sum of an integer error in the time of the millisecond event and a sub-millisecond offset between the receiver millisecond event and the true GPS millisecond time. The bias is the true time (±0.5-millisecond) difference between the receiver millisecond counter and GPS time. The true range (Rtotal) is the distance between a satellite and a receiver, also expressed in integer and fractional-milliseconds (Rint, Rfrac). The choice of using the millisecond event as the main time step comes from the GPS case where the satellite pseudo-random-noise sequence (PRN) repeats every millisecond. The codephase is a positive number between zero and one millisecond as the time between the received PRN epoch and the GPS receiver millisecond event prior to the received epoch (defined as msecEpoch).

If Rtotal is known, one equation can update two variables because bias and msecAdjust can be solved for by isolating the integer and fractional components.

Summarizing, biasEstimate=fractional part{*SPS*transmitTime+*R*total msec*Epoch*–codephase} msecAdjust=integer part{*SPS*transmitTime+*R*total–msec*Epoch*–codephase}.

MsecAdjust and bias can be estimated even if an approximate position only is available. A resulting estimation error is proportional to the error in estimated range to the satellite. The error is introduced in the estimated range (Rapprox) and it produces exactly the same amount of time set error in the adjustment variables msecEpoch and biasEstimate. The amount of actual position error that would create this range error depends on the geometry.

Even with a clock bias, the error in the time setting of msecAdjust and the estimated bias is dependent only on the error in approximate range, which itself is dependent on the error in the position.

Three types of timing measurement for an GPS satellite can be defined:

Type-1: total measured pseudorange using the received time message in GPS data message, data bit phase (BTT), and measured fractional pseudorange (codephase);

Type-2: data bit phase (BTT), and measured fractional pseudorange; and

Type-3: measured fractional pseudorange only.

The pseudorange (PR) can also be represented as the sum of an integer millisecond range and a fractional millisecond range. In GPS, the PRN repeats every millisecond and a typical value is 60-85 milliseconds. An GPS receiver generates zero codephase when its local PRN epoch occurs at the same time as the millisecond clock.

The fractional range is measured as the PRN codephase between zero and one millisecond where there is maximum correlation between the locally generated PRN code and the incoming signal. Because the wavelength of this signal is relatively large, the codephase by itself can provide an unambiguous relative positioning capability of ±150-km around an approximate position. But only when that position is within this range of the true position. A full measured ranging capability is only possible by receiving the GPS satellite timing message that measures the true integer range. So unlike with only the codephase, an approximate location is not needed to obtain a position. For example, (0,0,0) can be used.

In the GPS case, the time message contains the z-count which provides the GPS time of a known bit in the data sequence. Having this time reference means the time of any other data bit can be predicted. So the usage of z-count can express the time of any specific data bit.

$$\text{Pseudorange} = \text{measured reception time} - \text{satellite transmission time}$$
$$= (msec \text{ of received } z - \text{count} + \text{codephase}) -$$
$$(GPS\ msec \text{ of } z - \text{count})$$

The measurement can also be represented as having an integer and fractional portion (in units of milliseconds).

Pseudorange=integer msec+codephase (msecs)

When the data bit is 20-milliseconds long, the integer millisecond (intmsec) can also be written in terms of the number of integer data bits (N) and the fractional data bits phase (BTT): intmsec=N*20+BTT When z-count is available (a Type-1 measurement), Nzcount is the number of total data bits in the pseudorange constructed from the received z-count. The z-count is the part of the integer millisecond range that is multiples of 20. The $BTT_m$ is the measured sub-20-millisecond data bit phase, and measured codephase makes the fractional millisecond part:

Pseudorange measured=*N*zcount*20+*BTT$_m$*+codephase

When a z-count is not available, but a measured $BTT_m$ and codephase are available (such as with a Type-2 measurement), then N can be estimated from an approximate time and position. In this case, the number of data bits $N_{set}$ is estimated instead by equating the predicted range to the measured range. Such is formed by removing the estimated receiver clock bias from the measured pseudorange.

Codephase=*Rfrac*–bias.

Predicted range=*N$_{set}$*20+*BTT$_m$*+codephase+biasEstimate

Thus,

*N$_{set}$*=round to nearest integer[(predicted range–*BTT$_m$*–codephase–biasEstimate)/20].

$N_{set}$ is calculated correctly as long as the interaction of the time error and the position error do not combine to make more than 10-millisecond of error in the estimated pseudorange. The position error couples through the estimated range error and the time error manifests in the time-tag of $BTT_m$.

An ambiguity function is evaluated to determine if the N estimate can be trusted.

The error in the estimated range and the error in the receiver time appear with opposite signs. Thus, by inspection, N calculates correctly when,

|ErrorNset−ErrorTimeSet|<10, where errorTimeSet is the error in the satellite vehicle (SV) time set and ErrorNset is the error in the $N_{set}$ process.

The time set error is only a function of error in the predicted range. The common mode error of the predicted range equals the time set error when the correct N is calculated. The size of the clock bias does not affect the time set error or $N_{set}$ error. |ErrorNset−ErrorTimeSet| defines whether the N can be calculated correctly or not.

The integrity of the estimated total pseudorange is determined by the ambiguity function. When the receiver time is set by a Type-1 measurement, then ambiguity function says to:

Trust $N_{set}$ if |RangeErrorNset−RangeErrorTimeSet|<10, else, don't trust $N_{set}$.

If the maximum position error is less than 5-millisecond, then the maximum range error in either of these terms is always less than 5-millisecond, and so the ambiguity function can never be larger than 10, meaning that $N_{set}$ always calculates correctly.

When the position error is larger than 5-millisecond, the ambiguity range depends on the relative geometry between the time-set and N-set satellites. If they are more normal to each other, there will be more common error between them, leading to less error in $N_{set}$. Conversely, if they are more orthogonal, the error will be less common between them, leading to more error in $N_{set}$.

With only one Type-1 measurement for time-set, the best situation may be when the time-set is the highest elevation since it will have the least amount of horizontal position error. So, the lower elevation satellites are able to use up the rest of the 10-millisecond minus the error in the time-set SV. However, in case there are more than one Type-1 measurement, the best case is when the Type-2 satellite is more normal to the time set satellite so that the range difference will be more smaller, yielding a lower ambiguity result. In case there are enough high elevation SV's, it is possible that the position error can grow past 10-millisecond and the ambiguity function can still be less than 10-millisecond, meaning that the range of position error can be larger than 10-millisecond.

A fix with such a high elevation satellites will generally have a higher position dilution of precision (PDOP) and error than can be tolerated for a consumer expectation. The fix is generally accurate enough to allow the higher sensitivity Type-3 measurements to be added in a second fix that uses the first fix as the starting point. Such two step process is referred to as self-aiding.

When the receiver time is maintained by a real time clock (RTC) or any continuously running oscillator and when there are no Type-1 measurements available, then $N_{set}$ can still be estimated in a similar way. The time error cannot be measured directly in this case so a model of the time uncertainty Tunc is used as an upper bound on its contribution to the N estimate. However, the ambiguity function changes to:

Trust $N_{set}$ if |rangeErrorNset|+|Tunc|<10, trust $N_{set}$, else, don't trust $N_{set}$.

The GPS NAVdata message has a rate of 50 bits-per-second. Each bit is 20-milliseconds long and a new NAVdata bit leaves the satellite synchronously after 20 PRN's are transmitted. For a typical range to the satellite of 76-millisecond, there are three total bits of distance and then a fractional part of a data bit that is sixteen epochs out of twenty complete.

The process of measuring the BTT involves determining the state of a 20-millisecond counter that defines the GPS millisecond when the received data bit changes. The start of the current incomplete data bit is BTT-milliseconds earlier than the millisecond of the current epoch, but offset from the millisecond by codephase. Adding this additional event time extends the range over which position can be computed from the level provided by codephase, from ±150-km up to ±1500-km. A method for determining an accurate estimate of BTT for a weak signal is needed to gain this extension.

To estimate BTT, a phase reversal test statistic is formed for each epoch hypothesis from 0-19 for the location of the BTT. The test statistic is the dot product detector based on a series of correlator sums of the in-phase and quadrature data. In order to observe the data bit phase reversals, the locally generated frequency must be within 25-Hz of the true frequency. In conventional receivers with strong signals, this is done with an AFC or PLL loop. For weak signals, eGPS receiver embodiments of the present invention use a high sensitivity code and frequency tracking loop. These are driven by a strongest signal from the search window with a multitude of codephase and frequencies hypotheses from long non-coherent integrations times. The frequency spacing between hypotheses is small enough to reduce the frequency error. The inputs to the BTT estimation algorithm are the consecutive one millisecond in-phase and quadrature correlation results at the code and frequency loop state.

Every 20-milliseconds, twenty test statistics for the data bit phase are evaluated that use the in-phase and quadrature sums from two consecutive time windows. For the highest sensitivity, the time windows are each 20-millisecond. If the consecutive sums in each leg have a different sign, then the product will be negative indicating a potential data reversal.

A histogram with twenty elements corresponding to different BTT hypotheses is defined to integrate counts of events when the dot product at a given BTT hypothesis is negative. BTT is declared found when the histogram count at a particular BTT hypothesis reaches a confident value above the other candidates.

The BTT location is then converted to GPS time by associating the BTT location with the sum of the codephase plus the GPS-millisecond counter nearest to the epoch location of the winning BTT histogram.

After the BTT is determined, the NAVdata is demodulated by forming another dot product test statistic at the best hypothesis of the data bit phase. The Ibtt(k−1), Ibtt(k), Qbtt(k−1), Qbtt(k) sums are already formed to continue to update the BTT histogram result. Then these data are used to identify the actual data reversals of the NAVdata message itself. Initially, the first data bit for I(k−1), Q(k−1) is declared arbitrarily to any value: typically 0 is chosen. Then if the test statistic using I(k), Q(k) is negative, indicating a reversal, then the second bit is declared a one. Otherwise it is declared zero. Then the time index is moved by 20-millisecond, so that Q(k−1)=Q(k), I(k−1)=I(k), and a new set of data is collected for I(k), Q(k) to get the next bit, and the process is repeated.

When the signal is weak, the reversals might be declared falsely because a sign change can occur randomly when the signal is weaker than the noise. As the signal decreases, the dot product result is more often wrong due to noise in the correlator results. The 50-bps data is not done reliably, it wont pass parity.

However, the data bit phase is not a single event like the data, it keeps occurring, so the BTT histogram has the luxury of being also to integrate for a long period to average out the noise. As long as the signal is above the noise average, the histogram will eventually find the correct BTT when enough data is observed. Of coarse, the noise will cause the noise floor of the histogram to grow, but the true location will win if integrated long enough. A histogram up to 16-seconds can be used so that BTT can be estimated down to −150 dBm or lower. Typically, the data message can only be demodulated confidently down to a received signal strength of −145 dBm.

After decoding the raw NAVdata bits, the receiver commences a process of extracting the real message from the bits. It first looks for the preamble, which a fixed value of 0x8B in hexadecimal, or its complement in case the arbitrary starting phase is flipped from the true phase. After finding preamble, it forms a 30-bit word and computes the parity of twenty-four data bits and compares them to the 6-bits received parity bits. If they agree, it decodes the next 30-bit word as the HOW (hand-over-word) which contains the 17-bit z-count. Such variable gives the exact transmission in GPS time of the first bit of the next subframe which will occur after eight more words.

The integer millisecond portion of the total pseudorange is measured by comparing the observed reception time of the z-count to the value itself. For example, the receiver time tags the received bits with respect to its local GPS-millisecond clock. It can then predict at what time it will receive the first bit of the next subframe because each bit is 20-milliseconds. The difference in the predicted reception time and actual transmission time yields the intmsec range. For example, if the z-count itself says the time will be 6.0 seconds, and the true range plus the time error is 73.5-millisecond, the observed reception time of will have integer millisecond counter time tag will be 6073-milliseconds and a codephase of 0.3-millisecond. The integer millisecond range is 6073-6000=73 and the total measured pseudorange is 73.3-millisecond.

Because z-count can only be observed no faster than every six seconds, BTT is often used to estimate the sub 20-millisecond portion of the intmsec because the codephase can roll-over or roll-under after the lost observation of the z-count. Codephase is the non-linear truncated part of the total pseudorange than has to have a value 0-1 millisecond. Roll-over occurs when the codephase is increasing, and rolls over from a value close to a millisecond value and to a value near zero. Roll-under is the opposite case when the value is near zero, and decreases and wraps from a small value to a value close to a millisecond. However, because a signal can become weak, and disappear periodically, it may be difficult to observe z-count again, and thus, correcting the integer millisecond (intmsec) for roll-over can be difficult. For this reason, BTT is needed to keep the absolute part of the intmsec in agreement with the current codephase. Thus, BTT estimation is a continuous process.

A GPS receiver that starts with no information from a cold start will set its clock from the first z-count by using a guess of the integer millisecond around 72-milliseconds since this is the average intmsec. Such sets the time accuracy to roughly ±13-millisecond.

When the receiver decodes other SV's, then the computed intmsec will have the a common mode time error due to the error in setting the receivers local GPS-millisecond clock. However, because it is common mode, then this super millisecond time error can be observed. Such allows the clock to be observed and removed in the position fix.

It is important to define the time set error as having an integer millisecond part, and a part which is fractional defined to be ±0.5-millisecond. If the receiver position is calculated with a full PR's estimates from z-counts, then the super millisecond can be observed in the common mode clock bias solution of the GPS fix. The GPS millisecond counter is then adjusted to correct the error. The sub-millisecond portion is estimated in the fix. Most receivers don't move the millisecond location, but the bias estimate can be made available so that the exact time of the millisecond is still known. Because the error is common mode, the bias can be estimated to the accuracy of the position solution. If the position is accurate to 10 meters, then the time can also be set to that level, which is about 30-nanoseconds.

An GPS receiver with a data collection ability can compute is own position by forming total pseudorange and by receiving the satellite position information from the satellite signal. It can linearize the pseudoranges and estimate the position directly without any starting guess of time and position. The eGPS receiver also has this capability.

An important input for extended GPS fix operation is the accuracy of the GPS time clock in the GPS receiver. When the error is bounded, the range of positioning can be extended.

The mobile clients can be equipped with a number of methods for time maintenance between fix sessions.

An accurate real-time-clock (RTC) can be included in which a master clock remains powered while the rest of the receiver is off. In this mode, any clock bias is integrated from a propagating drift value, so the sub-millisecond portion of the bias can be maintained for long periods of time. (See, U.S. Pat. No. 6,714,160.)

A 32-kHz watch-type crystal can be kept powered while the master clock oscillator is turned off. For precision, the 32-kHz clock is always read on the receiver msec. To calibrate the RTC, the counter value is remembered at a specific-millisecond where the GPS time is known precisely after a fix. Then to use the RTC after the master clock power is restored, the counter is again read at a new-millisecond, and the difference in the counter values between the calibration step is added to the previous calibration time to obtain the current time. Both the super-msec time and sub-msec are estimated in this step. The advantage of this approach is that it requires less power than with the higher frequency master clock oscillator. The rate at which the error grows is mainly a function of temperature since this causes the frequency to change and the time error is the integral of the frequency error. It could be several hours or more before the time uncertainty grows past 5-millisecond. Uncertainties under 50-millisecond might be possible for a day of off time.

A time interval counter can be built in. (See, U.S. Pat. No. 6,473,030.) If another device connected to the GPS receiver has accurate time, then it can send a hardware pulse into the timeDiff circuit and the timeDiff will produce an accurate measurement of the time difference between the GPS-millisecond and external-millisecond. The other device will also send a message to the GPS of the time of the pulse. This way, after the GPS receiver has been powered-off, it can be accurately reset from an external accurate time source. The accuracy is dependent on the aiding system accuracy. However, a precision on the order of the period of the master clock is possible. Thus, an error much below a millisecond is possible.

In another case, the eGPS system is completely off, but time is maintained elsewhere in the system. Time is then supplied as a function call rather than as a hardware interrupt. Such is generally considered less accurate as the message propagation time is dependent on the host CPU and operating system loading. The accuracy may not be better than 50-milliseconds.

Alternatively, time can be extracted from a satellites GPS data message (the z-count for GPS). As shown above, the accuracy is bounded by the position accuracy when the range is predicted to set the receiver time.

For each time set model, a time error model is formed that provides a conservative upper bound on the error magnitude. The source that is available and has the smallest uncertainty is chosen as the time source and determines the current time uncertainty (Tunc). The level of time uncertainty determines how and whether the fix can be performed.

If the time uncertainty is larger than ten seconds, then a fix is not attempted.

If the time uncertainty is more than 50-milliseconds and less than ten seconds, the a special fix method called the no-Z fix (U.S. Pat. No. 6,714,160) is employed that has an extra unknown to model the additional error in the linearization of the pseudorange caused by the satellite position error due to being computed at an inaccurate time. Thus there are five unknowns rather than the classic four unknowns of three dimensional position and the clock bias. The cost of this time error is that an additional independent measurement is required to estimate the receiver position.

This zone is labeled TU4, where (50-millisecond<Tunc<10 seconds).

If the time uncertainty is less than 50-milliseconds, then the classic four unknown linearization of the pseudorange is used where there is not an additional term to account for the satellite position error.

Assuming four time uncertainties (Tunc) of the time error.

| TU4 | 50-millisecond < Tunc <= 10-millisecond |
| TU3 | 10-millisecond < Tunc <= 50-millisecond |
| TU2 | 5-millisecond < Tunc <= 10-millisecond |
| TU1 | Tunc <= 5-millisecond |

The selection of Tu3, Tu2, and Tu1 will be shown to depend the 0.25 and 0.5 wavelength of the 20 millisecond data bit.

Now that the time error zones have been defined, the extended fix strategy can be presented as a function of the combination of the time and position uncertainty zone.

Four zones of horizontal position uncertainty are defined around the most recent position estimate according to the position uncertainty (Punc). The position can be the most recent computed fix, or an externally supplied approximate location.

Each position source has a conservative model of how Punc is grown. The uncertainty from a previous position or breadcrumb grows according to the maximum user velocity model times the time since the fix or the indication of the breadcrumb identity. The uncertainty from a reference point or breadcrumb does not grow above its normal tracking range uncertainty as long as the reference identity is still indicated. Otherwise, the uncertainty grows at the same conservative rate of the maximum user velocity model. At the start of a session, the source with the smallest uncertainty is chosen as the source of the approximate position. Also, during a session, new identifiers will also be checked to see if they provide a smaller uncertainty than the current uncertainty.

Assuming for relative fix zones based on position uncertainty:

FUZ1—larger than 5-msec (Punc>1500 m)

FUZ2—less than 5-msec but more than 0.5-msec (150-km<Punc <=1500 m)

FUZ3—less than 0.5-msec but more than 0.25-msec (75-km<Punc <=150 m)

FUZ4—less than ¼-msec (Puns<75-km)

In the Fuz1, sub-75-km zone, the position error is known to ±0.25 of a millisecond. Such is maximum position uncertainty at which the ±0.5 millisecond ambiguity in the clock bias can be observed. A smaller bias uncertainty would mean a larger position uncertainty can be tolerated. A simple wrap check can be used to properly unwrap the non-linear wrapping of the receiver clock bias in the codephase measurement. The codephase with the smallest absolute value is chosen as a pivot. The codephase to any non-pivot satellites is adjusted up by one millisecond if the codephase is less than −0.5-millisecond from the pivot. Similarly, the codephase is adjusted down by one millisecond if the codephase is more than 0.5-millisecond from the pivot. Such is called the pivot method to unify the codephases to a common millisecond clock contribution.

If time can be set using a Type-1 measurement in this zone, then the time uncertainty must also be less than ±0.25 millisecond in TU1. It is often true that there is at least one satellite with a less obscured path that can yield a Type-1 measurement. Otherwise, the time source must be from an RTC or external time source.

In FUZ1, a position can be computed with either the no-Z fix if Tunc=TU4 or the classic fix if Tunc is lower TU4.

In the Fuz2, sub-150-km zone, the position error is known to ±0.5 of a millisecond. At this level of uncertainty it is not possible to also resolve ±0.5 millisecond ambiguity in the clock bias with the pivot method used in Fuz1. A method called the grid search is employed in this region. A grid of candidate positions is formed around the approximate position with a radius of 150-km where there is at least one point within a distance of 75-km of the true position. At this accuracy, the bias can be properly unwrapped with the pivot method described above. To detect the best grid, a test statistic is formed that contains the sums of squares of a double differences of predicted fractional range minus codephase so that the bias is cancelled. Before squaring, any double differences larger in magnitude than 0.5-millisecond are adjusted by the proper + or − one millisecond to produce a wrap with magnitude less than 0.5-millisecond. Often, a smaller grid spacing helps locate the best grid position when the geometry is problematic and there are other nearby minima that are not the global minima but can appear as the minimum when the grid spacing is large.

After the best grid point is located, the codephases are adjusted with the pivot method of FUZ1.

If time can be set using a Type-1 measurement, then the time uncertainty must also be less than ±0.5 millisecond and thus in TU1. Otherwise, the time source must be from an RTC or external time source.

In FUZ2, a position can be computed with either the no-Z fix if the Tunc=TU4 or the classic fix if the Tunc is lower TU4.

Experiments demonstrated how the clock bias effects the ability to fix with different amount of position error. A simple pivot method was used to un-wrap the codephase ambiguity. At each grid point, the difference between the predicted fractional range and the measured codephase was formed. Then the satellite with the smallest absolute value was chosen as the pivot. As a way to verify the correctness of the pivot, the integer millisecond range was wrapped according to the pivot outcome for each satellite. If the adjusted integer millisecond was equal to the true integer millisecond range, then the wrapped sub millisecond linearized measurement was correct at the grid point. If the adjusted integer millisecond was wrong, then the position was wrong by a large amount because the measurement error was then one millisecond or 300-km. With different cases for the clock bias, it was seen that only the position that has an error less than 75-km (¼-millisecond=FUZ1) will properly wrap the codephase minus fractional range estimate. When the error was larger than 75-km, but less than 150-km (FUZ2), the bias was not properly unwrapped as was the case for when the position error was greater than 150-km (>0.5-millisecond=FUZ3), even when the bias was zero.

The wrapped differences were manipulated to form a test statistic. For each difference, the next difference was used as a pivot. Then the difference was adjusted by a millisecond if the absolute value of the difference was larger than 0.5 millisecond. The test statistic was the square root of some of squares of the wrapped and pivoted differences.

The position that was within 75-km always had the smallest statistic, so the best grid location could be properly identified. Secondly, grid points that were further than 150-km could provide an even smaller test statistic that the best, most accurate position. Such was because the wrapping process allowed the larger error to be hidden. However, this was easily detected since the grid point was further than 150-km from the center, and thus, exceeds the position uncertainty. Such is why it is important that the Punc estimate be very conservative. If the true error is larger, then the grid test can fail.

The clock bias wrapping affects the position estimation. If the bias is allowed to grow beyond the normal definition of +0.5-millisecond, an interesting phenomenon occurs. In the first case, the bias was extended to 250,000 m (⅚-millisecond). The integer-milliseconds ranges were still correct, but the other points experienced large errors.

In another example, the bias sign was changed. All the integer millisecond ranges were wrapped the wrong way, but by the same amount. Such produced a common mode error that did not affect the position. However, the time was set wrong by one millisecond. The other grid points failed to compute position properly.

When only codephase is available, and no other measured satellite timing information can be obtained, then it is not possible to observe the super millisecond time errors in the process of the position fix. For weaker signals where the measurement noise is higher, position accuracy is only affected when the time error becomes more than about 50-millisecond. Beyond this time uncertainty, a no-Z fix strategy is needed to handle the effect of this time error. For stronger signals, the z-count can be observed and the time error is significantly smaller. An embedded A-GPS receiver that receives accurate time does not need to deal with this problem. The eGPS approach has to work harder to produce the same result as an A-GPS receiver. But, the eGPS receiver is a more independent and has the advantage that it works without the deep cellular infrastructure aiding.

In the Fuz3, sub-1500-km (<5-millisecond) zone, the position error is known to +5-milliseconds or +1500-km. Such is where the measured data bit phase (BTT) or z-count is used to extend the non-ambiguity range of the predicted total pseudorange beyond the range of the codephase measurement.

If there are three or more Type-1 measurements, then total pseudorange is completely measured and a position can be computed independent of the position uncertainty and time uncertainty.

In the extended GPS cases below, it is assumed that there are not at least three Type-1 measurements. The position availability depends on the combination of the time error and position error uncertainties.

For the Mixed Type-1 and Type-2 case, if there is at least one Type-1 measurement, and enough Type-2 measurements so that a total of at least three is available, then a position can be computed independent of the starting time uncertainty because the Type-1 SV will set time to better than 5-milliseconds. The ambiguity function will always be less than 10-millisecond so accurate $N_{set}$ is always provided. The total pseudorange can be estimated for the Type-2 SV's whenever there is a Type-1 measurement and the position uncertainty is less than 5-millisecond.

For the Type-2, TU2 case, if there are at least three Type-2 measurements and Tunc=TU2 (Tunc<5-millisecond), then the total pseudorange can be estimated for ALL the Type-2 measurements for the same reason that the ambiguity function cannot be greater than 10-millisecond.

For the Type-2, TU3 case, if there are at least three Type-2 measurements and Tunc=TU3 (5-millisecond <=Tunc<10-millisecond), then the total pseudorange can be estimated for ONLY the i-th Type-2 measurements if the ambiguity function Tunc+range uncertainty(i)<10-millisecond, where each of these uncertainties are positive.

A procedure to determine if the range uncertainty is less than the margin of (10-Tunc) for the given position uncertainty is used to form a circle of positions that defines a surface on the Earth with a radius of Punc with respect to the center of the surface at the approximate position. If the satellite range difference between the approximate position and the grid position is less than (10-Tunc), then the total pseudorange can be estimated for this satellite without ambiguity for a Type-2 measurement.

Summarizing, the pseudorange can be estimated for the i-th Type-2 measurement if the ambiguity for the i-th satellite:

|Rgrid(i)−Rcenter(i)|<(10-Tunc) for all points around the approximate position at a radius of Punc.

In the Fuz4, super-1500-km (>5-millisecond) zone, the position uncertainty is estimated to be larger than +5-milliseconds or +1500-km. Here again the BTT or the z-count is needed to extend the non-ambiguity range of the total pseudorange beyond the range of the codephase measurement.

Whereas there is a case in Fuz3 with Tu2 where the solution always exists, the ability to compute $N_{set}$ for the Type-2 measurements in this region always depends on the satellite geometry.

If there are three or more Type-1 measurements, then total pseudorange is completely measured, and a position can be computed independent of the position uncertainty and time uncertainty.

In the extended GPS cases below, it is assumed that there are not at least three Type-1 measurements. The position availability depends on the combination of the time error and position error uncertainties.

For the Mixed Type-1 and Type-2 case, if there is at least one Type-1 measurement, and enough Type-2 measurements so that a total of three is available, then a new ambiguity test called the SV time set ambiguity function is required on each satellite to determine if $N_{set}$ can be predicted confidently.

When time is set with the Type-1 measurement, the usability of the Type-2 satellite depends on whether all points pass the SV time set ambiguity test within a radius of the position uncertainty Punc. The ambiguity test on the i-th Type-2 measurement is: Trust $N_{set}$ if: |[Rgrid(i)-Rcenter(i)]−[Rgrid(TS)−Rcenter(TS)]|<10, for all points inside and around the approximate position at a radius of Punc.

The biggest protection radius for Punc occurs when the time set SV and the $N_{set}$ SV have the largest dot product. Thus, it should be clear that if there are two Type-1 SV's, then the dot product should be calculated for both possibilities of the time set SV and $N_{set}$ should be predicted with the time set SV that makes the largest dot product. Said another way, all Type-2 measurements need not use the same Type-1 to determine N. However, after N is determined, only one Type-1 SV should be used to adjust the BTT to GPS time for all measurements. Such ensures that the time error is common mode on all measurements in the position fix.

For the Type-2, TU2 or TU3 case, if there is no Type-1 measurement but there are at least three Type-2 measurements, then the method is the same for both Tunc=TU2 (Tunc<5-millisecond), and TU3 where Tunc<10-millisecond. In this case, the confidence for each satellite is evaluated with RTC ambiguity function as described in FUZ3.

In a weaker environment, the extended fixes first process a minimal set of the Type-1 or Type-2 measurements. In the case of high geometric-dilution-of-precision (PDOP), the accuracy may not be suitable for a high accuracy fix. However, even if the error is high, this fix can serve a valuable purpose of reducing the position uncertainty to a level where remaining Type-3 measurements can be processed in a second fix. Only codephase is needed in the region where the error is <75-km or <150-km, so FUZ1 or FUZ2 methods can be used. This is the same as the self-aiding fix.

Another strategy to extend the range for each satellite is to allow multiple values of N, since generally N can only be 3, 4. All the candidate position solutions are formed from all measurement combinations when some satellites have more than one. If the solution is over determined, more measurements than unknowns, then the one with the minimum sums of squares of a-posteriori measurement residuals (ARR) is isolated as the best solution. (This well known APR is a chi-squared statistic with M-N degrees of freedom.) With the two-step self-aiding approach, other Type-3 measurements can be added to make the solution over determined and add integrity. The advantage here is that satellite is not skipped when it fails the Punc surface.

Table Of Extended Fix Zone Methods
Assume if at least Type-1 SV's are available, then step 1, do full pseudorange fix.
If additional Type-2 or Type-3, then step 2 do a second FUZ1 or FUZ2 fix

| FixZone | FUZ1 | FUZ2 | FUZ3 | FUZ4 |
|---|---|---|---|---|
| Punc(-millisecond) | (¼-millisecond) | (0.5-millisecond) | (<5-millisecond) | (>5-millisecond) |
| Punc(-km) | <75-km | <150-km | <1500-km | >1500-km |
| Meas Pre-process method | Simple pivot method for bias | Grid search then simple pivot method for bias at best grid loc | Construct $N_{set}$ for Type-2 SV's | Construct $N_{set}$ for Type-2 SV's |
| TU1 Tunc <5-millisecond Fix method: classic fix | Time from: RTC or Type-1 SV X Type-1, Y Type-2, Z Type-3 (X + Y + Z) >= 3 | Time from: RTC or Type-1 SV X Type-1, Y Type-2, Z Type-3 (X + Y + Z) >= 3 | Time from: RTC or Type-1 SV X Type-1, Y Type-2, (X + Y) >= 3 No ambiguity test needed | Time from: RTC or Type-1 SV X Type-1, Y Type-2, (X + Y) >= 3 Use SV time set ambiguity test to find SV's that pass at radius Punc |
| TU2 5-millisecond < Tunc < 10-millisecond Fix method: classic fix | Time from: RTC Y Type-2, Z Type-3 (Y + Z) >= 3 | Time from: RTC Y Type-2, Z Type-3 (Y + Z) >= 3 | Time from: RTC Y Type-2 Y >= 3 Use RTC ambiguity test to find SV's that pass at radius Punc | Time from: RTC Y Type-2 Y >= 3 Use RTC ambiguity test to find SV's that pass at radius Punc |
| TU3 10-millisecond < Tunc <50-millisecond Fix method classic fix | Time from: RTC Y Type-2, Z Type-3 (Y + Z) >= 3 | Time from: RTC Y Type-2, Z Type-3 (Y + Z) >= 3 | Time from: RTC Need 3 Type-1 SV's | |
| TU4 50-millisecond < Tunc < 10 sec Fix method No-z fix | Time from: RTC Y Type-2, Z Type-3 (Y + Z) >= 3 | Time from: RTC Y Type-2, Z Type-3 (Y + Z) >= 3 | | |

Conventional cell-based communication modems, such as the ENFORA GSM modem allow access to the Internet through a cellular network operator. An GPS receiver can be integrated with an Enfora GSM modem to allow connection to the GPS server. These modems do not provide access to "inside-the-infrastructure" information that is available to an A-GPS subscriber through the cell-based information source. The "outside-the-infrastructure" client cannot receive the cell station position as taught in the prior art patent.

Fortunately, the cellular base station identity and location area code (station-ID and LAI) are two examples of identifiers that are in the GSM signal definition that are commercially available data. The station-ID is intended to be a locally unique code, but may not be globally unique. The location area code contains more general information about the country of operation, a region inside the country, and a code to identify the cellular operator or provider. While there is no guarantee that the cellular operators will have unique station-ID's, the combination of the station-ID and location area code would better provide a unique identity in a given region that is accessible. However, additional methods might be required to guarantee uniqueness and avoid ambiguity.

First of all, like a conventional GPS receiver, the eGPS receiver has a separate low cost oscillator as a frequency source for signal downconversion and sampling, and a 32-kHz watch-like low power oscillator to maintain accurate time between positioning sessions. It can fix any time independent of access to a cellular network for time and frequency information.

Secondly, it has the ability in hardware and software to demodulate the GPS data message. The timing information allows the receiver to measure total pseudorange and thus, determine its position autonomously without aiding. Furthermore, it can also collect satellite position information needed in the receiver position calculation.

In the process of determining the message data, it must also determine the data bit phase or the so-called bit transition time (BTT) that indicates the received fractional phase of the data message bit. For GPS, the 50-bits per second data bit rate yields a period of 20-milliseconds. A typical total range is 60-85-milliseconds. Such range can also be expressed as 3 or 4 integer data bits, plus 0-19 fractional data bit range (BTT).

Also, BTT can be measured at a much weaker signal level than the timing message. The timing message requires every bit to be observed correctly which is difficult with a signal below −145 dBm as the noise in even a 20-millisecond interval can be occasionally stronger than the signal. However, because each data bit transition produces an independent BTT measurement, and there are up to 50 bit transition per second, these measurements can be combined over a long period of time. A BTT estimated over 1-15 seconds can allow an accurate BTT measurement down to a signal level of −150 dBm. Also, only a high sensitivity receiver like the mobile client 124, 134, 136, can track the frequency at this signal level so that frequency error is maintained under half of the message data rate.

Combined with a previously computed receiver position, the measured data bit phase BTT can be used to estimate the total pseudorange when the position and timing uncertainty are each less then one fourth of the BTT range, or when the line of sight effect of each is less than ten-milliseconds. Thus, in degraded conditions where the timing message cannot be reliably demodulated, the BTT can be used to predict a pseudorange and allow a positioning capability of at least +1500-km and generally higher from a previous position.

If the signals are too weak to provide BTT, then the position can still be computed within ±150-km with a grid search method that allows the ambiguity effect of the GPS receiver clock time error to be eliminated from the fractional pseudorange measurements. The grid search isolates a position that is within +75-km and then a simple wrap check is sufficient to remove the any wrap of the sub millisecond clock offset so that the clock offset is common mode in all measurements.

Thirdly, if signal conditions are degraded, it can also request GPS satellite data from the GPS data server. The data sent by the server are in the form of a reduced size model so that the accuracy is degraded slightly from the true ephemeris to avoid infringement of complete ephemeris aiding patents.

The net effect is that the eGPS receiver greatly extends the range of a conventional GPS receiver with connection through the Internet to a GPS server that is not tied to the cellular infrastructure or the cellular network's cell-based information source.

In a tracking system application, the system is configured with three time intervals to maintain high sensitivity but with a low connection rate to an aiding server. The first interval is called $T_{fix}$ and describes the regular period at which a position is attempted. The $T_{fix}$ may be selected for maximum sensitivity. In this case, the $T_{fix}$ is related to the time it takes for the position uncertainty to grow to ±150-km, since this is the limit of using the last position as the approximate location in the most difficult (weakest) signal environment where measuring total pseudorange is impossible. For an application in Japan, the bullet train dictates the maximum user velocity of around 300-km/hr. Thus, it only takes 30 minutes to exceed the 150-km range. Thus a $T_{fix}$ of 10 minutes provides three chances that a fix can be made in the worst signal environments before the 150-km uncertainty is encountered. It is implied that receiver will only attempt a fix for a duration $T_{on}$, typically a few minutes, to avoid consuming power when the conditions are too tough for a fix.

The second interval is $T_{data}$ defines how often the eGPS receiver makes connect to the position registration server for satellite position information. Typically a collected ephemeris is good for four hours before the accuracy deteriorates. Thus, a typical rate is every two hours. To reduce data traffic, the eGPS receiver can chose to request only those ephemeris that it has not been able to collect recently.

The $T_{report}$ defines how often the position results are reported to an application or back to the server. If $T_{fix}$ is set much lower than Treport, the system can be configured to send all, or fewer points, e.g., the last point, or average point. A tracking application may only want to know the position once a day. In another application an alert is sent when the receiver leaves a designated area. Thus, it may have a fast fix rate to check the situation frequently, but only report if the alert criteria is met. In this case, Treport may also be used to trigger a "still alive" message needed to know the system is still operating properly.

For a mobile client 124, 134, 136, where the position requests are under human control, the Tfix may still be active in the background to keep the position uncertainty from growing unbounded, or it may also be set to never activate, so that the user has complete control of the positioning requests. The user will always have control over whether breadcrumbs will be shared with the server. A mobile client 124, 134, 136, whose position is computed locally will have inherently better privacy if its applications don't share their positions with applications that run on the server. The data requesting interval can also be adjustable by the user. Periodic data retrieval will reduce waiting time on position session activated by the user if the eGPS receiver already has current satellite data and local breadcrumbs.

If the receiver is in open sky or degraded conditions, the eGPS receiver will generally be able to fix without any aiding. Aiding in this environment can speed up the fix time, but it is not needed to enable the fix. In eGPS however, if the signals are weak and the GPS cannot receive enough timing information from the satellites it can track, then its ability to fix is dependent on the position uncertainty that grows as a function of the time since the last position calculation. EGPS can extend operation in this area because it can do a very wide autonomous relative fix around the last position with the satellite data bit timing information from as little as three satellites at or above −150 dBm. Without this requisite additional satellite timing, the eGPS receiver without breadcrumbs can only operate within 150-km of uncertainty from its last fix. Even if the position uncertainty grows large, the frequency search can always be expanded to a point where acquisition is still possible. The only cost is a reduced acquisition time. But the real detriment of a high position uncertainty is the necessity to receive additional timing information from the GPS satellites besides the codephase to resolve the total pseudorange. When the uncertainty is too high and satellite timing is not available, then even though the receiver is able to make the fractional pseudorange measurements, it still cannot fix because it cannot predict the total pseudorange without ambiguity.

Because the distance from a tower is never more than 150-km, the A-GPS receiver has the advantage that it can fix anytime independent of the signal level as long as the communication receiver is in contact with the cellular network that has a cell-based information source However, this requires an extensive monitoring of the cell base stations and may not provide ubiquitous operation across networks where the operators have not installed the cell-based information source.

One way to greatly improve the situation is to have reference positions where the receiver has already computed a location and to know when the receiver is again nearby that region so as to permit a relative fix when an autonomous fix is not possible.

Such a reference location is a breadcrumb, and reception of such information causes the eGPS receiver to search around this point up to a 150-km uncertainty and then use its grid search fix algorithm to fix using only fractional pseudorange information at the closest grid location. Thus, timing information to form total pseudorange is not required. Such means positioning is possible even in the weakest signal conditions when the GPS timing data message cannot be reliably received.

One method of storing and retrieving breadcrumbs is for the client to save and name reference positions in a database. Then later when the client returns to the vicinity of that breadcrumb, it can improve the ability to fix in that region by indicating to the receiver that it is near a stored reference point.

Another approach is to associate a name with a unique and specific city, town, or point of interest in a global sense. Such large database would be available at the server. The user can search through a directory of unique places, and if the user indicates they are in the proximity of this named identifier, and the reference position for breadcrumb can be retrieved from database, then the user does this to get a high sensitivity fixes capability in this vicinity. Continued indication of proximity via a button push keeps the position uncertainty from growing after the breadcrumb is received.

A further method embodiment of the present invention uses the cell base station to identify a breadcrumb. If the user is able to get a fix and then read this station-ID in a reasonable period around the fix, it can then associate this station-ID with the previous position. Thus at a later time, if it can read that ID, then it can recall this position from its database or the server and the receiver can then get its highest sensitivity in this region.

For certain types of breadcrumbs, a small uncertainty can be associated with the location. For example being in a small suburb, or at a small point of interest, or being near a cellular base station produces a small uncertainty about the distance between the true location and the center of the point of interest.

Also, in the case of cell sites, the ID may be read some time after the last GPS receiver fix. In the fast-moving Bullet Train case, a new cell site encountered five minutes after a previous GPS fix would have an associated uncertainty of (cellRange+300-km/hr*5/60)=cell range+5-km.

It can also share its breadcrumbs and identifier with other clients so that it can also receive the breadcrumbs from other users and expand its own database.

Embodiments of the present invention can take many forms. For example, a method of operating the mobile clients to extend their capabilities is firstly to obtain the most timing information possible from the GPS signals, even in weak signal conditions. This in order to fix autonomously with the highest level of uncertainty in its starting position. Secondly, when it is able to fix, it updates a database of fresh reference points and identities. These are thereafter used as approximate starting locations on subsequent fix sessions started in the vicinity of the same reference point.

A method for extending the position capability of an GPS receiver includes computing a fix with at least three Type-1 measurements, regardless of position uncertainty. Then, computing a position fix if there is at least one Type-1 SV and enough other Type-2 SV's so that there are at least three SV's with total pseudorange. Same as saying at least one SV with a z-count and then enough others with measured data bit phase (BTT). If no Type-1's are available, computing a position fix if there is at least three Type-2 SV's and an accurate local real time clock. Same as saying at least three SV's with measured data bit phase BTT. Then, determining a total pseudorange using a codephase, a measured fractional data bit (BTT) and a predicted number of data bits based on an approximate location. Then, determining a predicted number of data bits where time is set by either reception of satellite time message or an accurate local real time clock, and, determining a predicted number of data bits with a measurement of the fractional data bit phase. The data bit phase is estimated with a long term histogram to improve the sensitivity so that the phase can be estimated for a weaker satellite. An ambiguity function is used to determine the confidence in an estimated number of data bits.

Multiple candidates are computed for the number of data bits and then forming multiple full-pseudorange position fixes candidates. The best candidates are selected for each satellite based on a test statistic when the full pseudorange fixes are over determined. The test static is the minimums sums of squares of a posteriori measurement residuals (APR).

The selection of the best candidates for N for each satellite is based on adding remaining Type-3 measurements to produce an over determined fix and then using the APR test statistic. An SV time set ambiguity function is used to determine the confidence in N when time is set from the received time message from at least one satellite (a Type-1 measurement). An RTC ambiguity function is used to determine the confidence in N when time is set from a local real time clock. A second step position calculation is used to add integrity and accuracy by adding Type-3 measurements to the fix that could not be processed in a first full pseudorange based position calculation step when the position uncertainty after the first step is reduced to the range of ambiguity of the codephase.

When the starting combination of position uncertainty and time uncertainty exceed the ambiguity of the codephase measurement, a grid search technique can be to isolate an improved approximate location where the combination of position uncertainty and time uncertainty do not exceed the ambiguity of the codephase measurement.

A pivot wrap method can be used to unwrap the clock bias effect in the codephase when the combination of position uncertainty and time uncertainty do not exceed the ambiguity of the codephase measurement.

A fix interval $T_{fix}$ is the first of a three interval system that maintains the position uncertainty below a level so that the codephase is adequate to measure the position change with no ambiguity.

A data request interval $T_{data}$ is the second of a three interval system at which time a reduced satellite position ephemeris is requested for any or all satellites from an position registration server 108 with the Internet via a cellular modem in order to ensure that the models are never older than their range of usability (typically 4 hours). This reduced model does not contain all the parameters of the transmitted ephemeris so that the accuracy is degraded slightly.

A data report $T_{report}$ interval is the third of a three interval system at which the position is reported. A means of building a local database of breadcrumb reference points uses an autonomous fix capability. After a fix is computed, the GPS receiver may request a cell station identity from the cellular modem being used to connect to a position registration server via the Internet. Or the client can manually associate a specific unique name for the location.

Embodiments of the present invention share the local database with a master server database so that the master can build a database that is the union of all clients local database. The client can use the server to store and retrieve their lifetime specific breadcrumbs. A configurable number of breadcrumbs can be obtained from the server so that the client will always have all the breadcrumbs that could be covered in the period until the next update.

The server (and or client) can filter algorithms on the database to handle non-unique breadcrumbs and inactive cell sites. The server (and or client) can filter algorithms on the database to improve the position estimate and an estimate of its common range of use. The server can include additional unique breadcrumbs of unique points of interests such as cities, tourist locations where there is a unique name for such a location. Positions for such breadcrumbs names are generated manually by operators at the position registration server 108 or by clients who send a position and a unique breadcrumb name. For example, "SFO" for San Francisco Airport. Receiving this breadcrumb assures good fixing capability inside the airport needed when someone is there to take them home.

At the start of a positioning session, a client can either receive a breadcrumb from the user database, or may read the station-ID and request an approximate position from the GPS server. If the breadcrumb uncertainty is less than the user uncertainty, then the approximate position is adopted to set the FUZ.

The processing time to acquire at least one GPS satellite can be reduced using a cell-based communication receiver by, (1) obtaining a breadcrumb identity, (2) using a current or recent cellular identity, (3) using a unique breadcrumb name supplied by the user.

The extended GPS (eGPS) GPS receiver architecture has high sensitivity like the A-GPS receiver, and can maintain that sensitivity without the constant aiding required by the A-GPS receiver. It is able to extend its ability to compute position for longer periods that would be possible for a conventional receiver or A-GPS receiver. Also, it can operate much longer in difficult conditions without aiding that is difficult for the A-GPS receiver.

U.S. Pat. Nos. 6,670,915, issued Dec. 30, 2003, and 6,683,564, issued Jan. 27, 2004, by the present inventor, provide helpful details on the construction and operation.

FIG. 5 represents a server aiding a mobile client that is not able to demodulate the Navigation Message itself because of attenuation. A system embodiment of the present invention, herein referred to by general reference numeral 500, receives microwave signal transmissions from an overhead constellation of SPS satellites 502. A signal 504 is reduced in strength during its line-of-sight flight by an attenuation 506, e.g., by a building when indoors. A high-sensitivity SPS receiver 508 nevertheless is able to work with such signal, even though highly attenuated. One consequence of the attenuation is the 50-Hz NAV-data message may not be discernable or reliable, so it may need to be obtained by alternative means in some SPS receivers of the present invention. A full-strength signal 510 is received by a reference station 512, and so it can and does reliably demodulate such 50-Hz NAV-data message. Such reference station 512 may also have a surveyed position which allows it to compare its SPS position solution to its true position. Such comparison will reveal the magnitude and direction of various errors, e.g., ionospheric and tropospheric induced errors.

The pseudoranges can be directly measured by SPS receiver 508 if it already has the NAV-data message information. Such is because code-division multiple access (CDMA) demodulation techniques allow long sample periods to be collected and worked to take advantage of correlation processing gains. A radio receiver 514 tunes to such transmissions and a correlation processor 516 measures the various pseudoranges to the visible satellites.

In one embodiment, a navigation processor 518 gets time information from a real-time clock (RTC) 520 and the z-count, ephemeris, and almanac NAV-data information from a NAV-data synthesizer 522. U.S. Pat. No. 6,714,160, issued Mar. 30, 2004, provides more detail on the construction and use of such an RTC. Otherwise, time, z-count, ephemeris, and almanac NAV-data information are conventionally obtained.

The NAV-data synthesizer 522 reconstructs a suitable 55-frame NAV-data message that would have been received by radio receiver 514 if the attenuation 506 had not been so severe. The remote reference station 512 does not provide time information to the client 524, only current ephemeris and almanac data. Since the communication channel with the remote reference station 512 will typically be much higher bandwidth than 50-Hz, the current ephemeris and almanac data can be transferred in far less time than the normal 12.5 minutes it takes the satellites 502 to transmit it.

The client 524 receives the ephemeris, almanac, NAV-data, and other information. The z-count and timing information is computed by NAV-data synthesizer 522 and by reading the time from RTC 520. The NAV-data synthesizer 522 formats the combined information into a message that the navigation processor 518 can accept and work with naturally.

The RTC 520 is accurate to within three seconds, so the z-count can be correctly written into the synthesized NAV-data and thus avoid integer ambiguities. A position solution output 526 is therefore possible from the navigation processor 518. Such is especially true when combined with the other inventions and technologies developed by the present inventors and already incorporated herein by reference.

The remote reference station 512 comprises its own complete navigation satellite receiver 528 that routinely and continuously tracks the navigation satellite constellation 502. A whole NAV-data message 530 is extracted over the 12.5 minute message transmission time and then stored in a local memory. A time-stripper 532 removes the timing information, e.g., z-count. An ephemeris and almanac NAV-data 534 is distilled and available to a network server 536. A network or other communication-system connection 538 allows the client 524 to request information that will assist it to initialize and/or to continue computing position solutions.

The communication-system connection 538 may not always be available, so SPS receivers of the present invention are able to operate with infrequent connections to the remote reference station 512.

In a business model embodiment of the present invention, the owner/user of SPS receiver 508 may be charged a per-use fee or subscription charge for such NAV-data aiding information by the operator of the remote reference station 512.

As a result, SPS receivers of the present invention are particularly well suited for use indoors and elsewhere where the signal levels drop below −145 dBm.

FIG. 6 represents a portable handheld device embodiment of the present invention, and is referred to herein by the general reference numeral 600. The portable handheld device 600 can be implemented with components that are commercially available now, and its functionality can be readily and simply ported to newer devices as they become available.

Telephones, e-mail, Internet browsers, GPS, television, cameras, smart credit cards, RFID, and many other functions are now all merging together on devices that once only supported cell phones. Software, in the form of intellectual property (IP) libraries, can be used to implement these modern appliances. Today's microcomputers have so much capacity and versatility, that several such appliances can be combined in one portable handheld device as software applications running on a single host processor. Only the very specialized input and output circuitry needs to be attached to support particular applications, e.g., radio frequency (RF) and baseband downconversion stages for cell phones and GPS.

At a minimum, portable handheld device 600 includes an eRide, Inc. (San Francisco, Calif.) OPUS ONE chipset 602 to acquire and track orbiting GPS navigation satellites. Such OPUS ONE chipset 602 presently includes an OPUS ONE baseband integrated circuit (IC) 604 and a PRELUDE ONE RF receiver IC 606. A temperature compensated crystal oscillator (TCXO) 608 provides a reference frequency. The OPUS ONE baseband IC 604 includes an OPUS state machine 610 for serial communication with a host CPU, a GPS satellite acquisition processor 612, and a tracking processor 614. A patch antenna 616 is used to receive GPS signals as weak as −157 dBm in indoor, outdoor, and urban canyon situations. A serial communications interface 618 is used to communicate pseudoranges and other measurements to a host processor. This simple output interface is key to being able to use newer and better host processors and GPS chipsets as they become available.

A suitable, and currently available device to use as a host processor 620 is the WIRELESS CPU with OPEN-AT multitasking operating system that are commercially sold and marketed by Wavecom, Inc. (Research Triangle Park, N.C.). The WIRELESS CPU products, e.g., Q2687, provide general purpose input/output (GPIO) ports, TCP/IP sockets, serial UART's, and global GSM, GPRS, and EDGE operation with an ARM9 core.

The host processor 620 includes a processor core 622 such as an ARM9, and an operating system (OS) 624. The OS 624 allows AT-type modem commands to be used to control the WIRELESS CPU. A radio frequency (RF) quad-band chip 626 supports GSM 850, E-GSM 900, DCS1800, and PCS1900, with low noise amplifiers (LNA's), a direct conversion receiver, a phase locked loop and polar loop (PLL/PL) transmitter, a frequency synthesizer, a digitally controlled crystal oscillator (DCXO), and a Tx/Rx front-end module (FEM) for quad band GSM/GPRS. A multimedia baseband chip 628 can be implemented with a PHILIPS PCF5213 NEXPERIA handset baseband controller.

A main serial link (UART1) 630 provides a six-wire V24 protocol interface to GPS chipset 602. An auxiliary serial link (UART2) 632 is similar, and provides a general purpose serial channel for other applications that may also be hosted on host processor 620. An interface is provided for a subscriber identification module (SIM) to enable GSM/GPRS/EDGE subscription connections worldwide.

A temperature sensor 634 can be used to implement the software controlled oscillator (SCXO) described by the present inventor in U.S. Pat. No. 6,714,160, issued Mar. 30, 2004, and United States Patent Application 2005/0195105, published Sep. 8, 2005. A real-time clock (RTC) 636 can be slaved to the highly accurate time base of the GPS system. During such times, the amount of correction and the operating temperature are both tracked. It is assumed that the operating temperature will have the greatest influence on frequency errors that occur later when the real-time clock cannot be slaved to the GPS time base. After the GPS is powered-down, the RTC 636 is nevertheless kept alive. Its free-running frequency is corrected for temperature. The next time the GPS receiver is powered up, time accurate to better than one millisecond in a day can be obtained instantly for use in GPS receiver initialization procedures.

A TCP/IP socket 638 provides access to a GPS-aiding information server. An OPEN-AT controller 640 provides AT-type modem commands. Several application program interfaces (API's) 642, 646, and 648, provide software interfaces for hosted application programs, e.g., a GPS application 654 and other AP's 652. Here, AP 652 consumes position solutions for its own purposes.

The GPS application 654 can call for GPS aiding information from an Internet server via API 642 and TCP/IP socket 638 over the GPRS radio link supported by the RF and baseband GSM chips 626 and 628. The OPEN-AT controller 640 provides a means for obtaining location area identifier (LAI) and "breadcrumb" information such that the GPS application 654 can skip having to make a z-count determination during initialization. A not-to-exceed (NTE) distance limitation is given in which a z-count attached to a local monument can be assumed as the correct z-count to be used in initializing the GPS application.

In a business model embodiment of the present invention, an intellectual property (IP) library 660 of GPS functionality may be sold to the manufacturer or user of device 600.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A wireless handset (102), comprising:
    a wireless-CPU (120, 122, 124) that functions as a host processor and provides access to a satellite model server (114) through a local wireless cell base station (106) whose location has been previously logged into a breadcrumb database (226);
    a GPS chipset (132) connected to provide pseudorange measurements (134) to the wireless-CPU; and
    a GPS application (154) hosted by the wireless-CPU and for providing more rapid initial position solutions derived from said pseudorange measurements by requesting and receiving from said breadcrumb database (226) location information associated with a particular location area identifier (LAI) corresponding to said local wireless cell base station (106);
    wherein, the GPS application (154) adopts a particular z-count previously associated with the LAI for its cold start initialization and assumes a not-to-exceed (NTE) operational distance separation limitation between the wireless-CPU (120, 122, 124) and said wireless cell base station (106) is not being exceeded.

2. The wireless handset of claim 1, further comprising:

a real time clock (RTC) included in the wireless-CPU and providing for time estimates to the GPS application that help speed initial position solution production by reducing time uncertainties that occur during initialization.

3. The wireless handset of claim 1, further comprising:
a temperature sensor included in the wireless-CPU and providing for software error correction estimates of the drift of a reference oscillator to the GPS application that help speed initial position solution production by reducing frequency uncertainties that occur during initialization.

4. The wireless handset of claim 1, further comprising:
a serial interface between the GPS chipset and the wireless-CPU over which said GPS measurements are provided; and
a GSM radio frequency (RF) and baseband device included in the wireless-CPU and providing for an Internet connection in which to access said GPS-aiding information server.

5. A method for providing GPS position solutions in a wireless handset, comprising:
using a wireless-CPU (120, 122, 124) to function as a host processor that can access a satellite model server (114) through a local wireless cell base station (106) whose location has been previously logged into a breadcrumb database (226);
connecting a GPS chipset (132) connected to provide pseudorange measurements (134) to the wireless-CPU; and
hosting a GPS application (154) with the wireless-CPU to provide more rapid initial position solutions derived from said pseudorange measurements by requesting and receiving from said breadcrumb database (226) location information associated with a particular location area identifier (LAI) corresponding to said local wireless cell base station (106);
wherein, the GPS application (154) adopts a particular z-count previously associated with the LAI for its cold start initialization and assuming a not-to-exceed (NTE) operational distance separation limitation between the wireless-CPU (120, 122, 124) and said wireless cell base station (106) is not being exceeded.

6. The method of claim 5, further comprising:
including a real time clock (RTC) in the wireless-CPU to provide for time estimates to the GPS application that help speed initial position solution production.

7. The method of claim 5, further comprising:
reading a temperature sensor included in the wireless-CPU to make software error correction estimates of the drift of a reference oscillator to the GPS application that help speed initial position solution production.

8. The method of claim 5, further comprising:
using a serial interface between the GPS chipset and the wireless-CPU to communicate said GPS measurements; and
using a GSM radio frequency (RF) and baseband device included in the wireless-CPU to provide for an Internet connection in which to access said GPS-aiding information server.

\* \* \* \* \*